United States Patent
Miazgowicz et al.

(10) Patent No.: US 10,138,803 B2
(45) Date of Patent: Nov. 27, 2018

(54) WASTEGATE FOR AN ENGINE SYSTEM

(71) Applicant: Ford Global Technologies, LLC, Dearborn, MI (US)

(72) Inventors: Keith D. Miazgowicz, Dearborn, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/624,309

(22) Filed: Jun. 15, 2017

(65) Prior Publication Data
US 2018/0128162 A1 May 10, 2018

Related U.S. Application Data

(63) Continuation-in-part of application No. 15/347,669, filed on Nov. 9, 2016.

(51) Int. Cl.
*F02B 37/18* (2006.01)
*F02B 37/02* (2006.01)

(52) U.S. Cl.
CPC .......... *F02B 37/186* (2013.01); *F02B 37/025* (2013.01)

(58) Field of Classification Search
CPC .... F02B 37/183; F02B 37/025; F02B 37/186; F16K 1/2014; F01N 3/2006
See application file for complete search history.

(56) References Cited

U.S. PATENT DOCUMENTS

| | | | |
|---|---|---|---|
| 7,562,528 B2 | 7/2009 | Wood | |
| 8,449,250 B2 | 5/2013 | Anschel et al. | |
| 9,021,802 B2 | 5/2015 | Petitjean et al. | |
| 2010/0221107 A1* | 9/2010 | Anschel | F02B 37/00 415/206 |
| 2011/0005222 A1* | 1/2011 | Hayashi | F02B 37/183 60/602 |
| 2011/0173974 A1* | 7/2011 | Grabowska | F01D 17/105 60/602 |
| 2012/0234002 A1 | 9/2012 | Lombard et al. | |
| 2015/0345375 A1* | 12/2015 | Grabowska | F02B 37/183 415/148 |
| 2016/0146213 A1 | 5/2016 | Sanketh et al. | |
| 2016/0341109 A1* | 11/2016 | Lummer | F02B 37/025 |

FOREIGN PATENT DOCUMENTS

| DE | 3735736 A1 | 5/1989 |
|---|---|---|
| DE | 102012218137 A1 | 6/2014 |

* cited by examiner

*Primary Examiner* — Patrick Maines
(74) *Attorney, Agent, or Firm* — Julia Voutyras; McCoy Russell LLP

(57) ABSTRACT

Methods and systems are provided for a wastegate of a turbocharger including a valve plate, valve actuation mechanism, and a bifurcated wastegate passage. In one example design, the wastegate may include a valve plate having an interior with a multiplane curved surface and a first mating feature centered along the curved surface, the curved surface forming a raised edge and a side opening on opposite sides of the valve plate; and a passage bifurcated by a central wall, an end of the central wall including a second mating feature adapted to have face-sharing contact with the first mating feature. The first mating feature may be either a rib or recessed slot formed on the valve plate, and the second mating feature may be one end of the central wall.

15 Claims, 15 Drawing Sheets

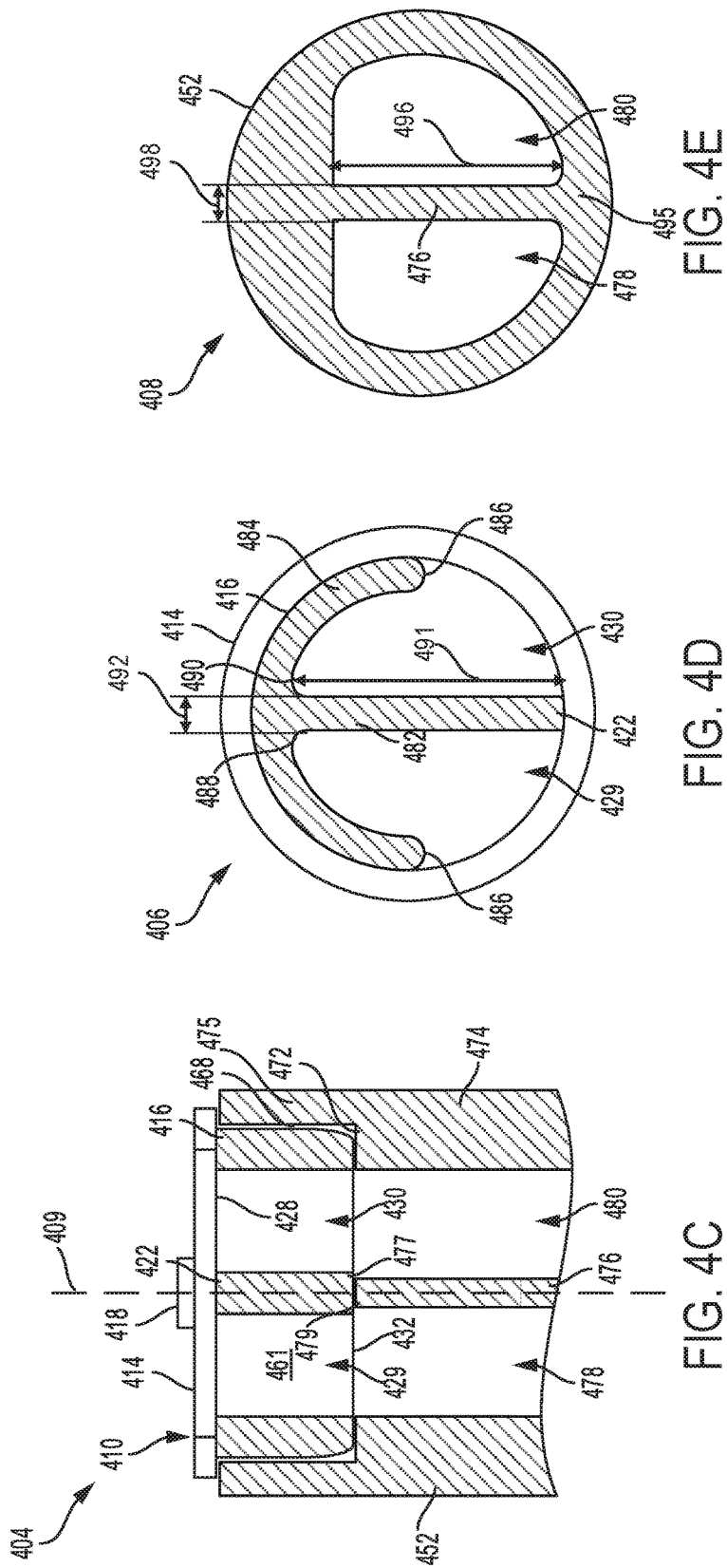

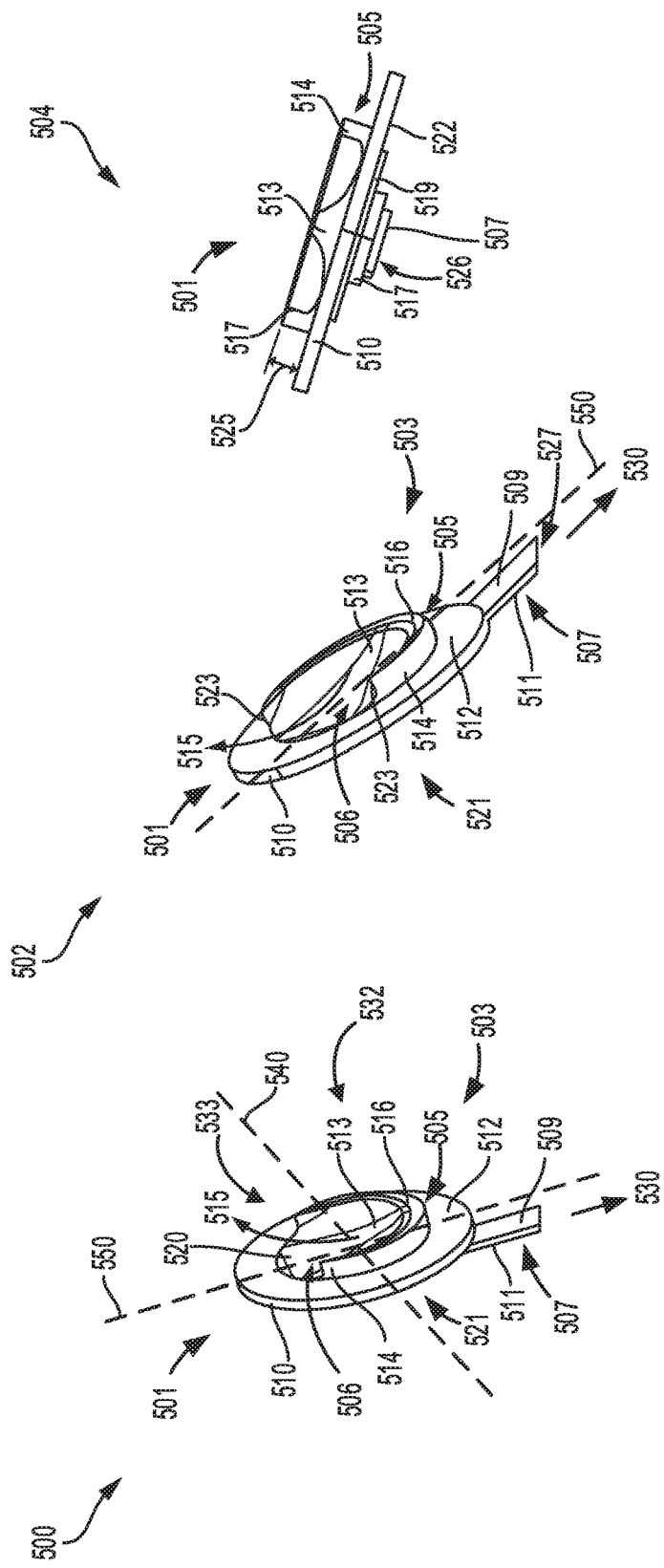

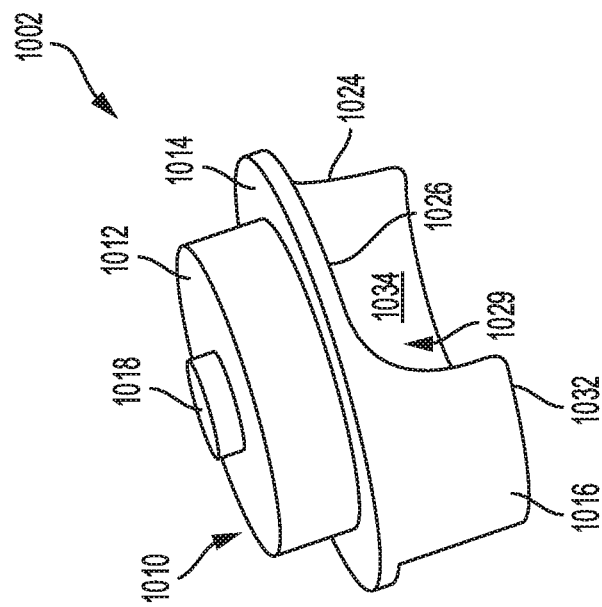
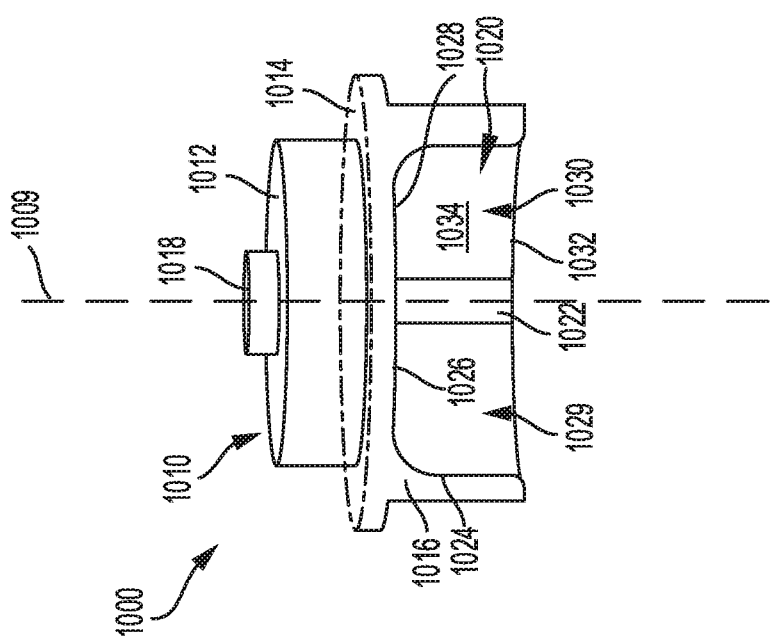
FIG. 10B
FIG. 10A

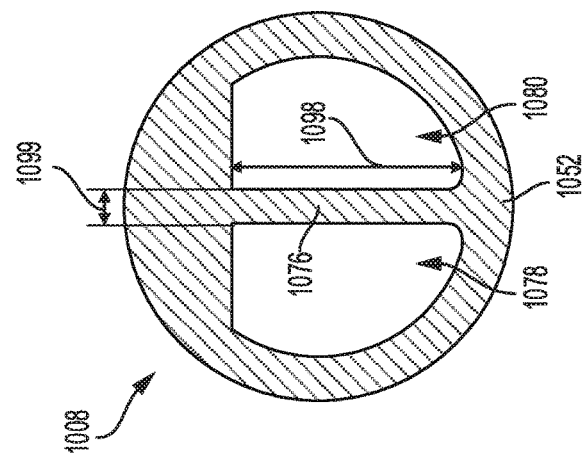
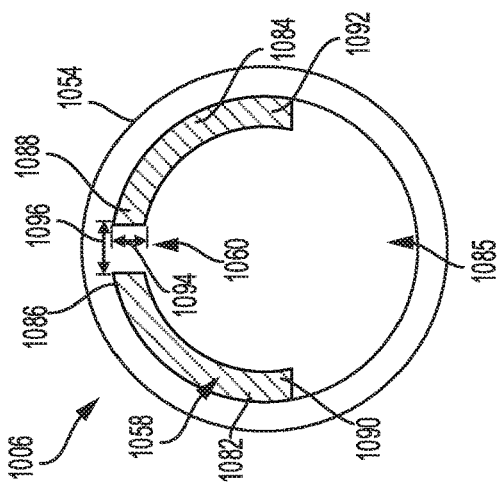
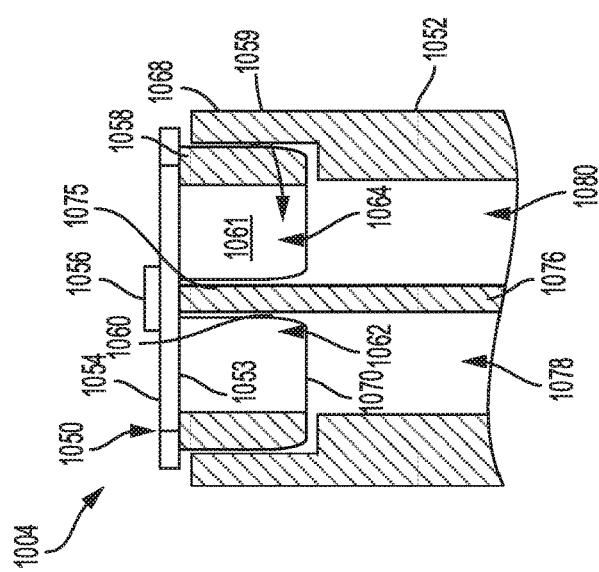
FIG. 10E
FIG. 10D
FIG. 10C

WASTEGATE FOR AN ENGINE SYSTEM

CROSS REFERENCE TO RELATED APPLICATION

The present application is a continuation-in-part of U.S. patent application Ser. No. 15/347,669, entitled "A WASTEGATE FOR AN ENGINE SYSTEM," filed on Nov. 9, 2016, the entire contents of which are hereby incorporated by reference for all purposes.

FIELD

The disclosure relates to methods and systems of a wastegate mounted to an exhaust passage of a turbocharger to direct exhaust flow to an exhaust catalyst.

BACKGROUND AND SUMMARY

Exhaust flow in a turbocharger system may be partially directed to an exhaust driven turbine to drive a compressor that delivers air into engine cylinders, while the remaining portion of the exhaust gas may be flowed via a bypass passage around the turbine to an exhaust catalyst placed downstream of the turbine. The bypass passage may include a wastegate valve that may be adjusted into an open position, thereby allowing exhaust gases to bypass the turbine and flow to the catalyst. The wastegate valve may be adjusted into a closed position that at least partially blocks exhaust flow in the bypass passage and thus most of the exhaust gas delivered from the engine is directed to the turbine. During an engine cold start, exhaust gas may be at least partially routed through the bypass passage and wastegate in order to direct exhaust flow to a front face of the catalyst, thereby enabling catalyst light off to be reached more quickly.

Other engine systems may include a split exhaust manifold wherein at least some exhaust from a first set of cylinders is directed to a first scroll of a turbocharger turbine via a first exhaust manifold and at least some exhaust from a second set of cylinders is directed to a second scroll of a turbocharger turbine via a second exhaust manifold. In these systems, the at least some exhaust from the first and second set of cylinders may be diverted away from the first and second scrolls and instead routed to a bypass passage coupled to both the first and second exhaust manifolds, the bypass passage having a wastegate that may be adjusted between a closed and open position to direct exhaust flow to a catalyst positioned downstream of the wastegate and the turbocharger turbine.

One example design of a wastegate valve in an exhaust passage of a turbocharger is disclosed by Grabowska in U.S. patent application 2015/0345375. Therein, a wastegate valve assembly having flow formations is provided to direct exhaust gas in a primary flow direction while reducing exhaust losses in secondary flow directions. Specifically, the wastegate includes flow formations on a valve body, supported on a valve arm that is pivotally supported on a turbine housing. Example flow formations on the valve body include a concave shaped disc, shallow ribs and an extended semi-circular surface formed on the valve body to direct exhaust flow in the primary direction.

The inventors herein have recognized potential issues with the example approach disclosed above. For example, in the valve body configured with the concave shape disc or shallow ribs, exhaust flow may fan out in multiple directions, impinging on turbocharger walls and creating turbulent flow conditions. As a result, exhaust energy may be transmitted to the turbocharger walls leading to reduced flow efficiency and energy losses. Also, since the flow fans out in multiple directions before flowing downstream, less exhaust heat may reach the catalyst and thus delayed catalyst lightoff may occur.

The inventors herein have developed a wastegate design to at least partly address the above issues. In one example design, a wastegate may be provided comprising: a valve plate having an interior with a multiplane curved surface and a first mating feature centered along the curved surface, the curved surface forming a raised edge and a side opening on opposite sides of the valve plate; and a passage bifurcated by a central wall, an end of the central wall including a second mating feature adapted to have face-sharing contact with the first mating feature.

In this way, the design of the wastegate may be used to improve flow efficiency and reduce energy losses in the turbocharger while improving catalyst lightoff. For example, the multiplane curved surface on the valve plate may act in conjunction with a constricted section in the passage to guide exhaust flow and increase flow velocity downstream of the wastegate. In another example, the central wall may divide the wastegate passage into a first and a second side, where the first side receives exhaust flow from a first scroll coupled to a first group of cylinders and a turbine, and the second side receives exhaust flow from a second scroll coupled to a second group of cylinders and the turbine. In this way, the wastegate design may confer several advantages. By directing exhaust flow downstream instead of fanning out in multiple directions, the wastegate may reduce exhaust energy losses to turbocharger walls. Further, the constricted section in the passage may allow the exhaust flow to speed up before exiting the wastegate. By providing a bifurcated passage coupled to the first and second scrolls of a turbocharger, exhaust flow from the two particular groups of cylinders may not communicate with one another.

For example, the two groups of cylinders may be established such that in the firing order of the engine, the exhaust from subsequent cylinders alternates between the first scroll and the second scroll. Such a configuration can allow a four cylinder engine to use exhaust valve lift durations that exceed 180 degrees without having the high exhaust manifold pressure of one cylinder at the beginning of the exhaust event pushing exhaust gas into the previous cylinder at the end of its exhaust event. Exhaust valve lift durations greater than 180 degrees are desirable to improve pumping efficiency of the engine. Additionally, using a manifold and turbocharger with separated passages allows for smaller volume between the cylinder exhaust valves and the turbine which increases the conversion of blowdown exhaust energy into turbine work. This can improve the fuel economy and transient performance of the vehicle. Further, by including a first mating feature on the valve plate and a second mating feature on the central wall of the passage, when the valve plate is closed against the passage, the first and second mating features may seal against one another, thereby reducing exhaust flow communication between the two sides of the passage (and thus the two scrolls of the turbine). In this way, the wastegate valve may reduce exhaust energy losses to improve catalyst lightoff conditions while reducing fuel emissions and increasing performance of a twin scroll turbocharger.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4C shows the third embodiment of the wastegate valve in a closed valve position.

FIG. 4D shows a cross sectional view of a valve plate of the third embodiment of the wastegate valve.

FIG. 4E shows a cross sectional view of a wastegate passage of the third embodiment of the wastegate valve.

FIG. 5A shows a first view of a valve plate of a fourth embodiment of a wastegate valve.

FIG. 5B shows a second view of the valve plate of the fourth embodiment of the wastegate valve.

FIG. 5C shows a third view of the valve plate of the fourth embodiment of the wastegate valve.

FIG. 10A shows a first three dimensional view of a fifth embodiment of a wastegate valve.

FIG. 10B shows a second three dimensional view of the fifth embodiment of the wastegate valve.

FIG. 10C shows the fifth embodiment of the wastegate valve in a closed valve position.

FIG. 10D shows a cross sectional view of a valve plate of the fifth embodiment of the wastegate valve.

FIG. 10E shows a cross sectional view of a wastegate passage of the fifth embodiment of the wastegate valve.

FIGS. 2A-10E are shown to scale, although other relative dimensions may be used, if desired.

DETAILED DESCRIPTION

Figure 1:
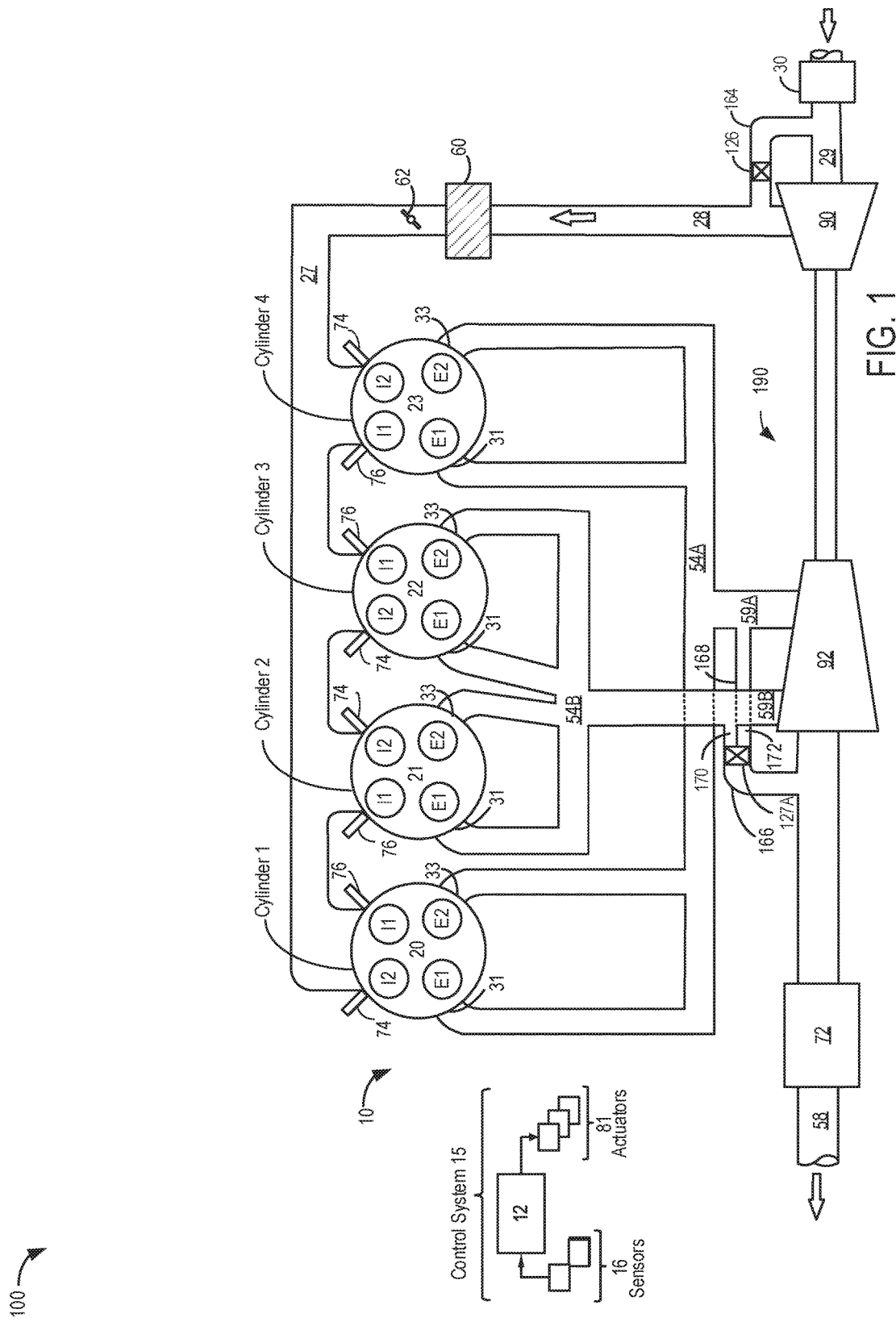
FIG. 1 shows a schematic depiction of an engine system including a turbocharger system having a twin scroll turbine with an exhaust bypass passage configured with a wastegate valve.
Figure 2A:
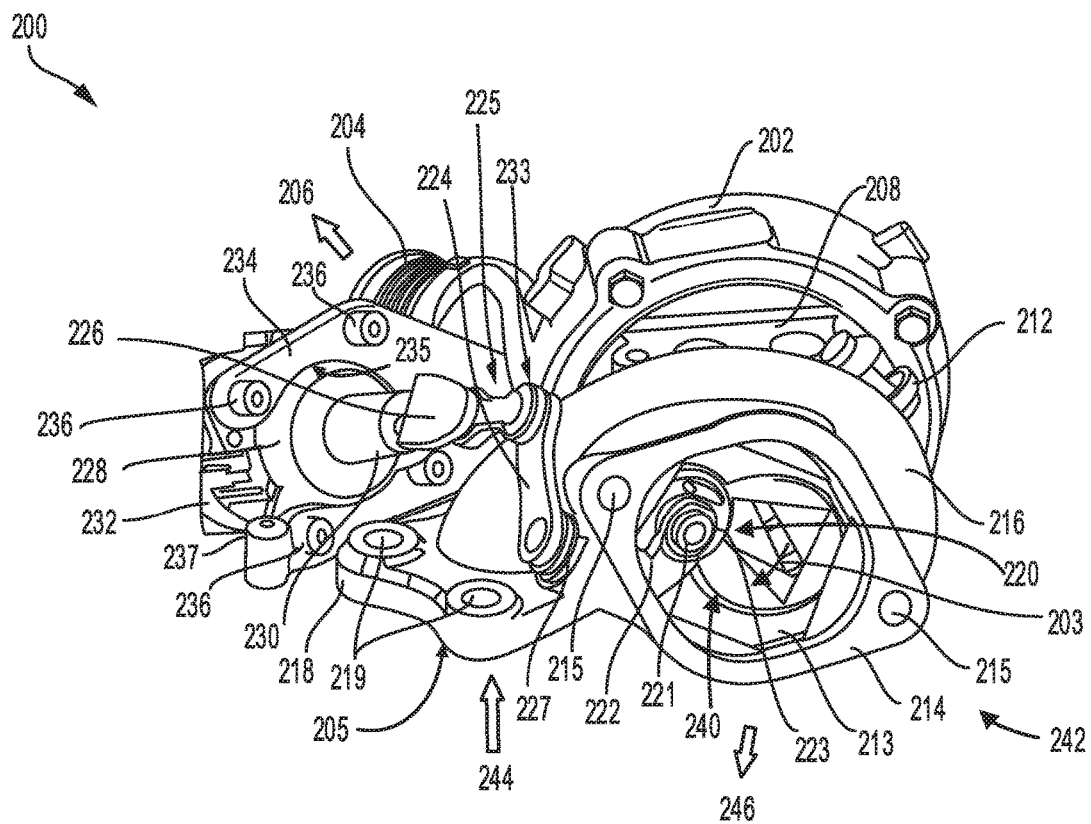
FIG. 2A shows an example turbocharger comprising an exhaust bypass passage having a wastegate valve.
Figure 2B:
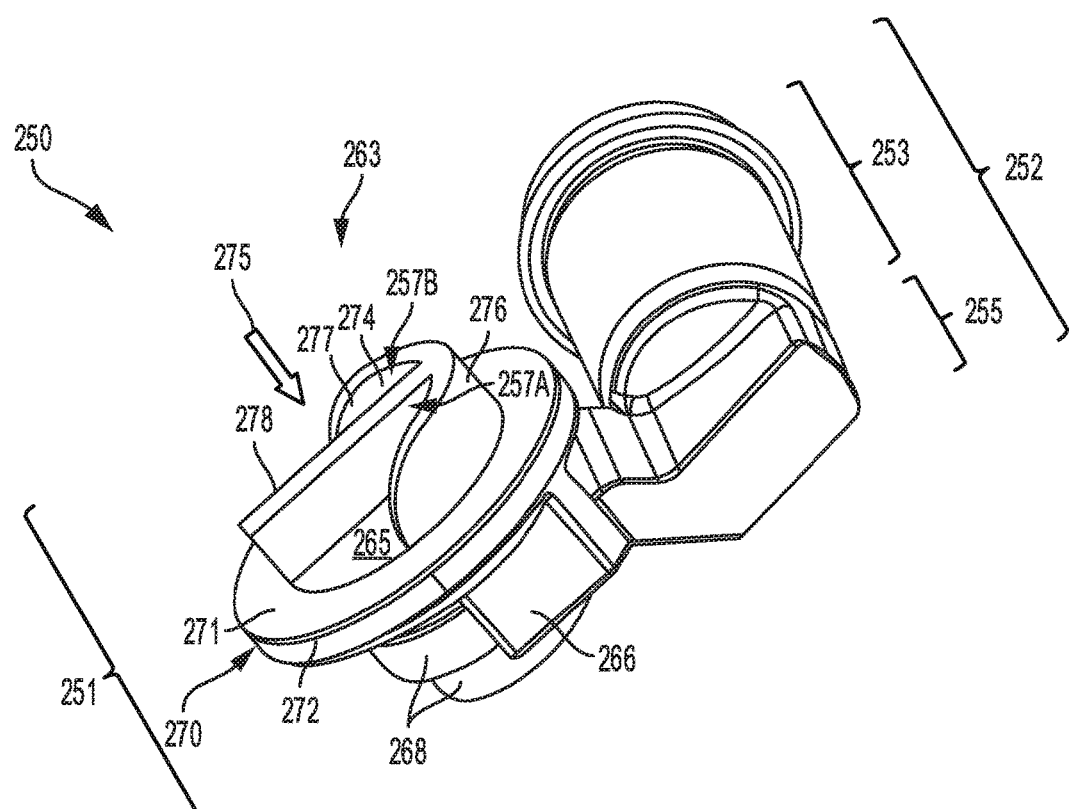
FIG. 2B shows a schematic depiction of a first embodiment of a wastegate including a wastegate valve with a valve plate actuator.

The following description relates to a turbocharger system with a bifurcated bypass passage configured with a wastegate to control exhaust flow around a twin scroll turbine and to an exhaust catalyst placed downstream of the turbine in an engine, as shown in FIG. 1. As depicted in FIG. 2A, an example engine turbocharger having a wastegate valve including a valve actuation mechanism to control exhaust flow within a bypass passage around the turbine and to the exhaust catalyst is disclosed. The wastegate valve may be adjusted to open or close by the actuator mechanism using various means including mechanical, hydraulic, electrical, and other suitable actuation methods. FIG. 2B shows a schematic view of a first embodiment of the wastegate including a valve plate and a valve plate actuator. The wastegate also includes a passage with a curved interior surface that may act to direct exhaust flow delivered from engine cylinders (via the exhaust passage) to the exhaust catalyst.

Figures 3A, 3B:
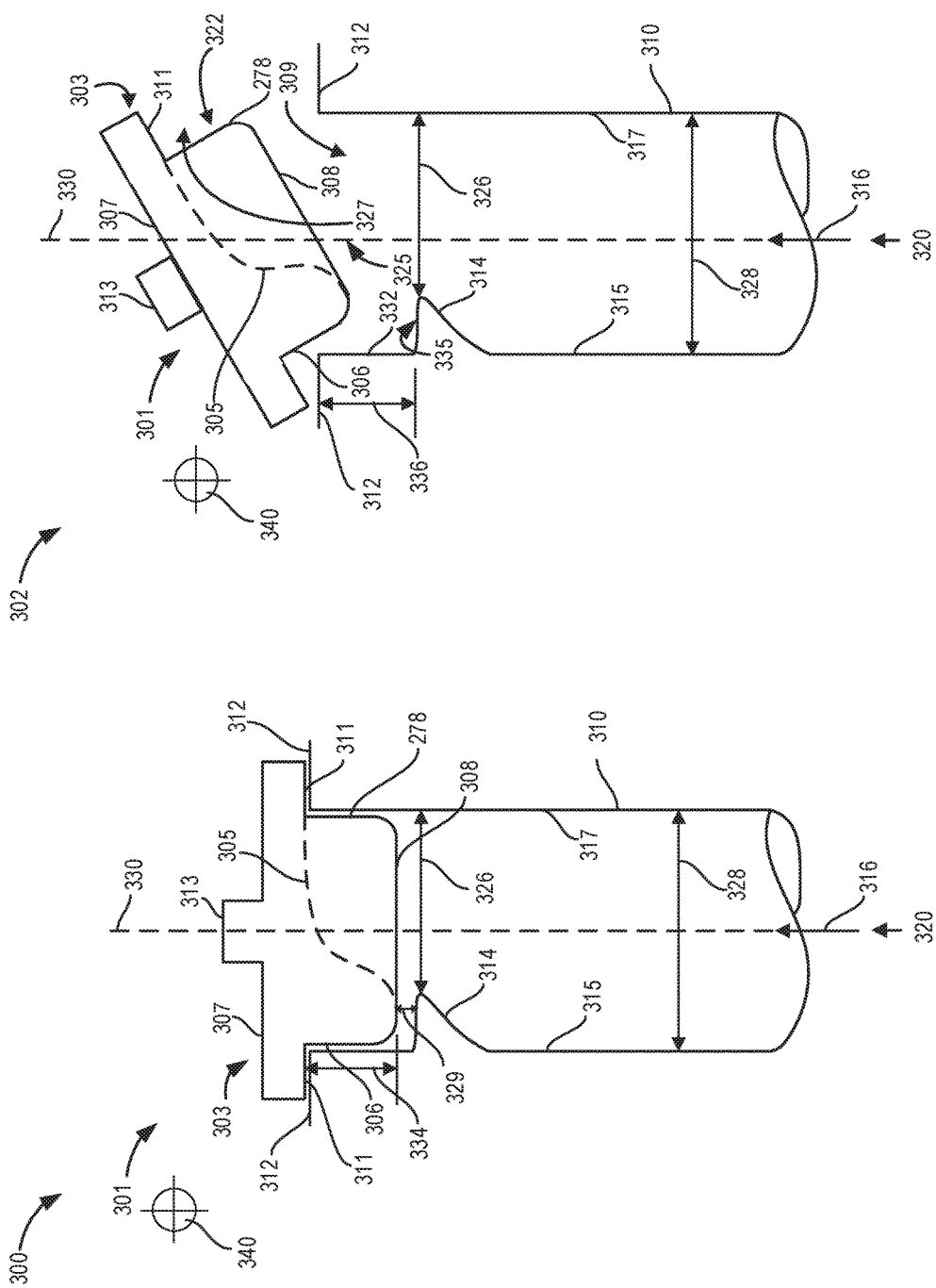
FIG. 3A shows a first view of a second embodiment of a wastegate valve in a closed wastegate position and having a passage with a constricted section formed on an internal wall of the passage.
FIG. 3B shows the second embodiment of the wastegate valve in an open position.
Figure 3C:
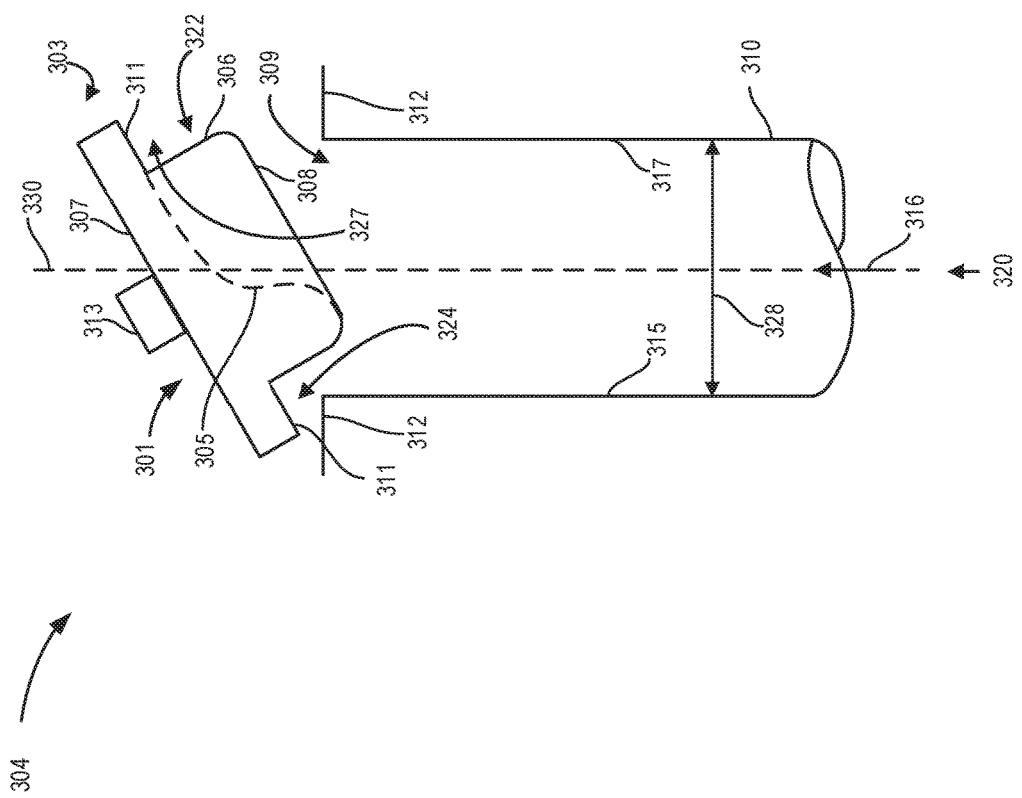
FIG. 3C shows an alternative embodiment of a wastegate valve in an open position and having a passage with no constricted section formed on an internal wall of the passage.

FIG. 3A shows a first view of a second embodiment of the wastegate valve in a closed wastegate position and having a passage having a constricted section formed on an internal wall of the passage. The wastegate valve may be adjusted into an open position to allow exhaust flow through an outlet of the wastegate, as shown in FIG. 3B. An alternative embodiment of the wastegate valve in an open position and having a passage with no constricted section formed on an internal wall of the passage is depicted in FIG. 3C. In this case, the exhaust gas may flow in multiple directions, as shown. The exhaust flow fanning out of the wastegate outlet, may impinge on walls of the exhaust passage downstream of the valve and cause turbulent flow conditions, which may lead to exhaust energy loss.

Figure 4A:
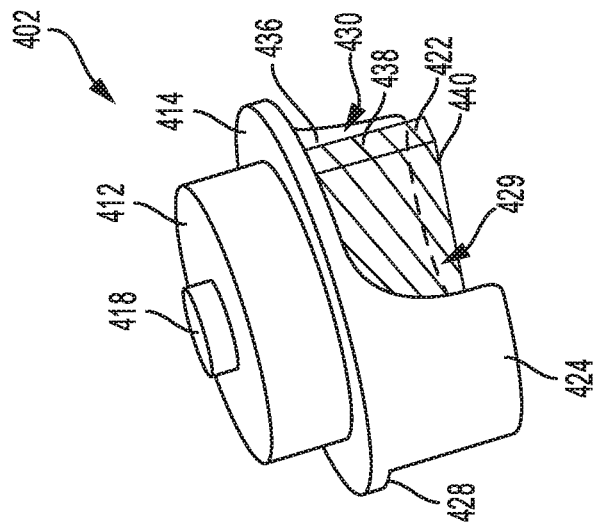
FIG. 4A shows a first three dimensional view of a third embodiment of a wastegate valve.

FIGS. 4A-4E show a third embodiment of a wastegate valve that includes a rib extending from an inner portion of a valve plate. The rib may divide the valve plate into a first and a second section. The valve plate includes a rib that connects to a base plate, and extends outward into a wastegate passage. As an example, the rib may include a curved portion connected to a linear portion, as shown in FIG. 4D. A cross sectional view of the wastegate passage is depicted in FIG. 4E. In this case, the central wall bifurcates the passage into a first and a second side.

Figure 6A:
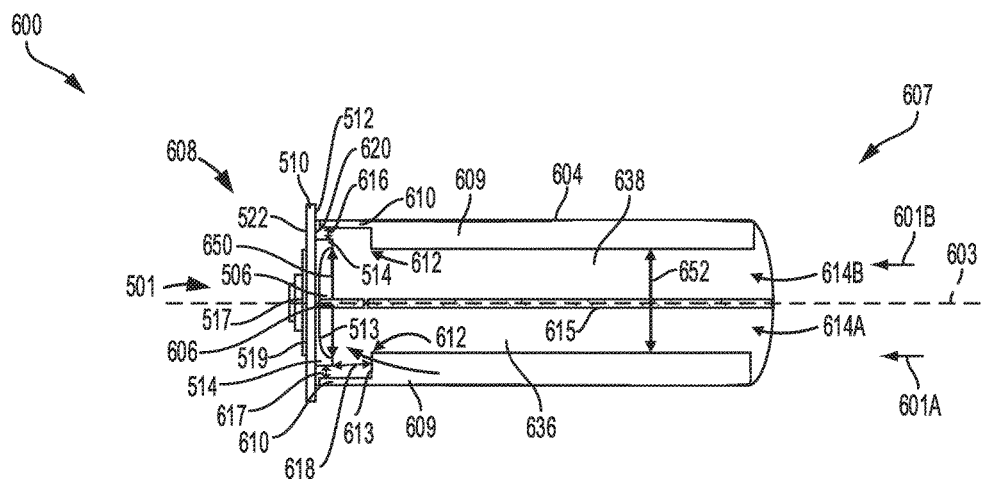
FIG. 6A shows a schematic view of the fourth embodiment of the wastegate valve in a closed position.
Figure 6B:
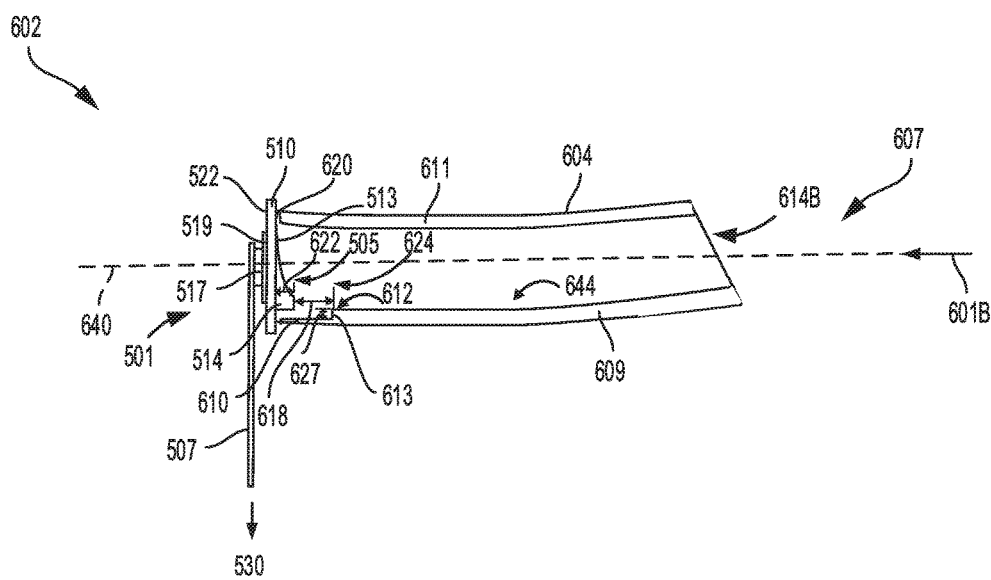
FIG. 6B shows a cross sectional view of the fourth embodiment of the wastegate valve in the closed position.
Figure 6C:
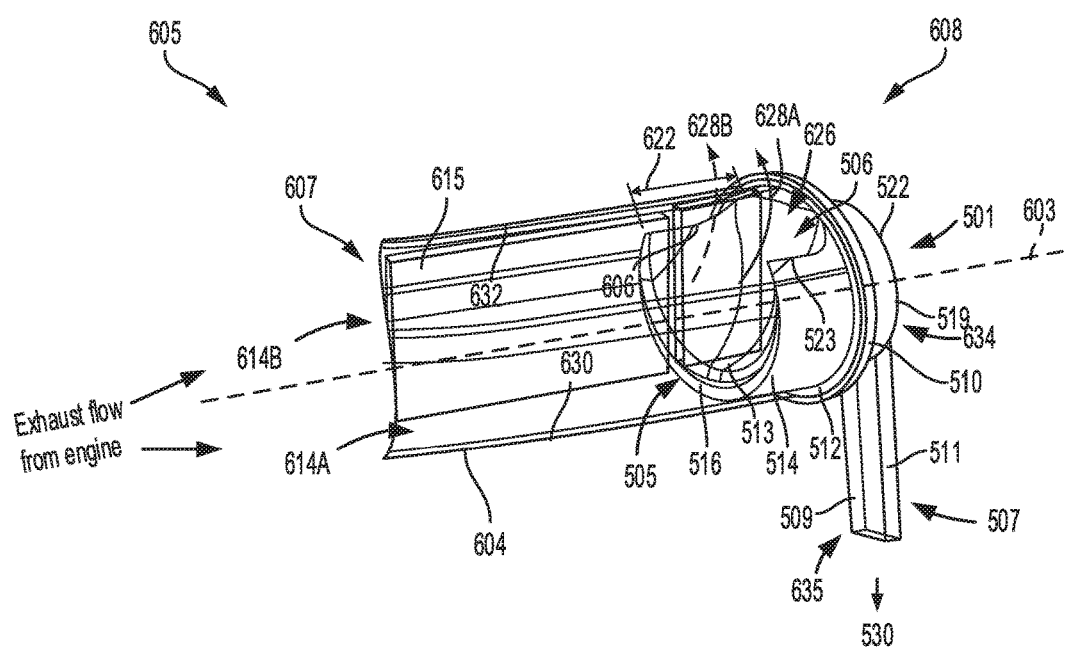
FIG. 6C shows a three dimensional view of an alternative embodiment of the wastegate valve in the closed position.

FIGS. 5A-5C show schematic views of a valve plate of a fourth embodiment of the wastegate valve. FIGS. 5A-5B show a first and second view, respectively of the valve plate of the fourth embodiment of the wastegate valve. FIG. 5C shows a third view of the valve plate of the fourth embodiment of the wastegate valve. FIGS. 6A-6B show schematic views of the fourth embodiment of the wastegate valve in a closed position. FIG. 6A shows a first view of the closed wastegate valve. FIG. 6B shows a second view of the wastegate valve in the closed position. In each of the first and second views in FIGS. 6A-6B, the wastegate valve having features similar to the valve plate disclosed with reference to FIGS. 5A-5C is disclosed. FIG. 6C shows a schematic view of an alternative embodiment of the wastegate valve in the closed position.

Figure 7A:
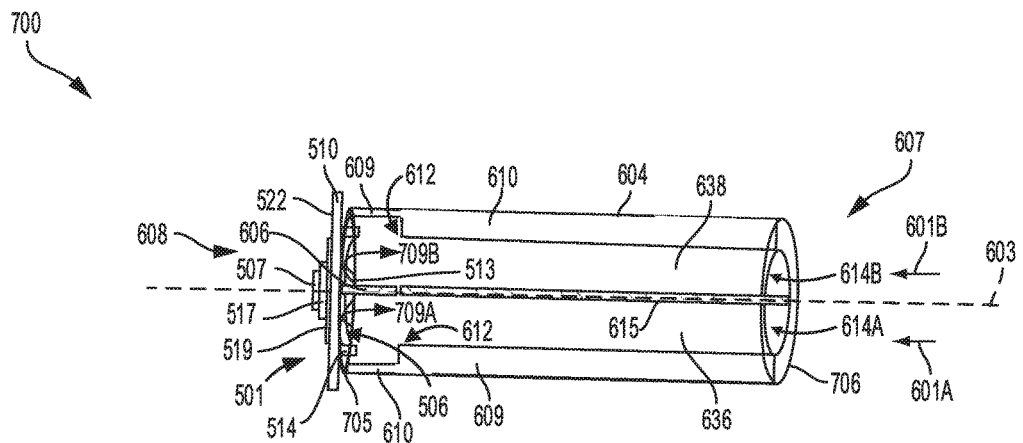
FIG. 7A shows a schematic view of the fourth embodiment of the wastegate valve in a partially open position.
Figure 7B:
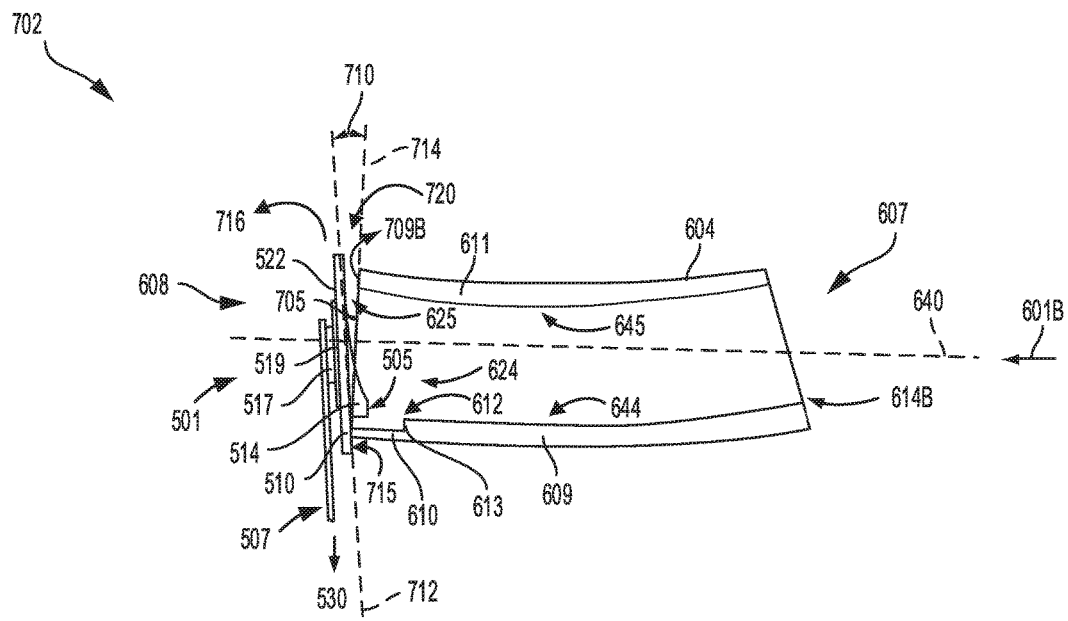
FIG. 7B shows a cross sectional view of the fourth embodiment of the wastegate valve in the partially open position.
Figure 8A:
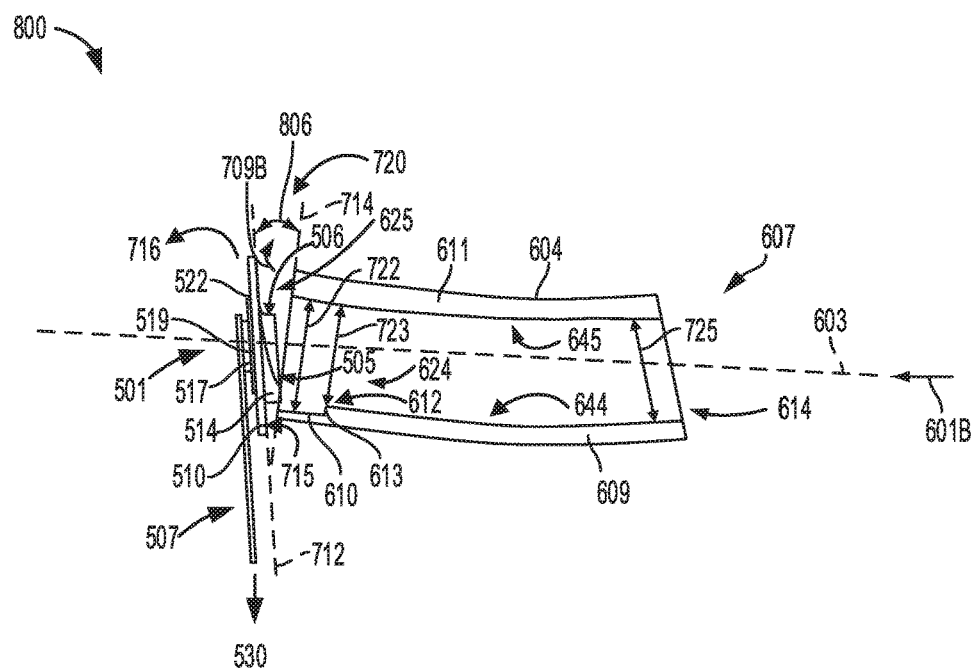
FIG. 8A shows a cross sectional view of the fourth embodiment of the wastegate valve in a fully open position.
Figure 8B:
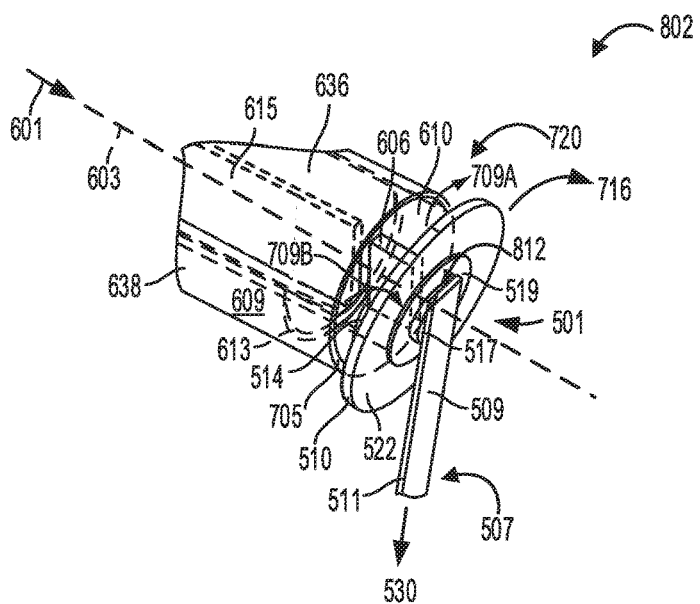
FIG. 8B shows a three dimensional view of the fourth embodiment of the wastegate valve in the fully open position.
Figure 9A:
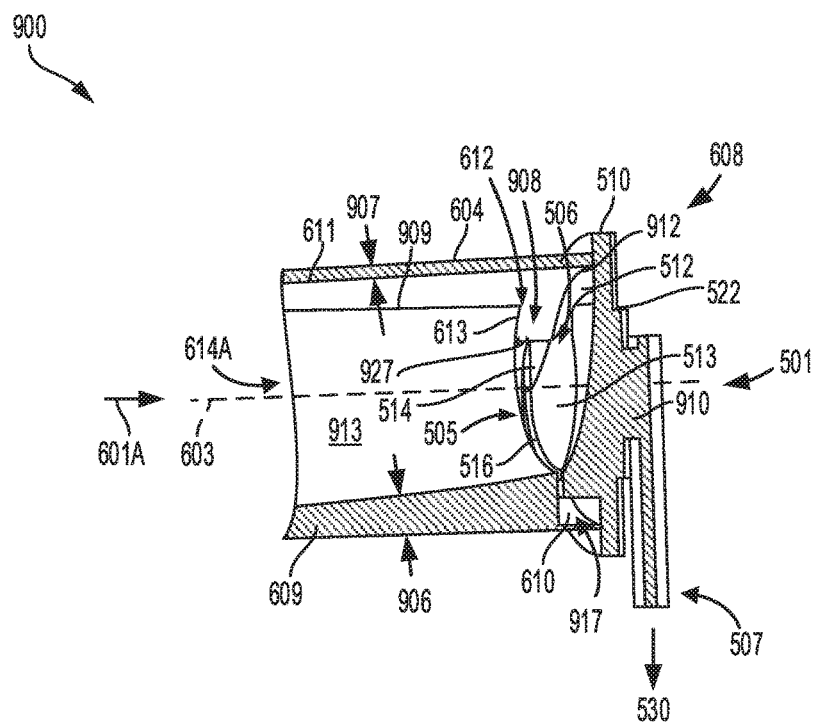
FIG. 9A shows a first cross sectional view of the fourth embodiment of the wastegate valve in a closed position.
Figure 9B:
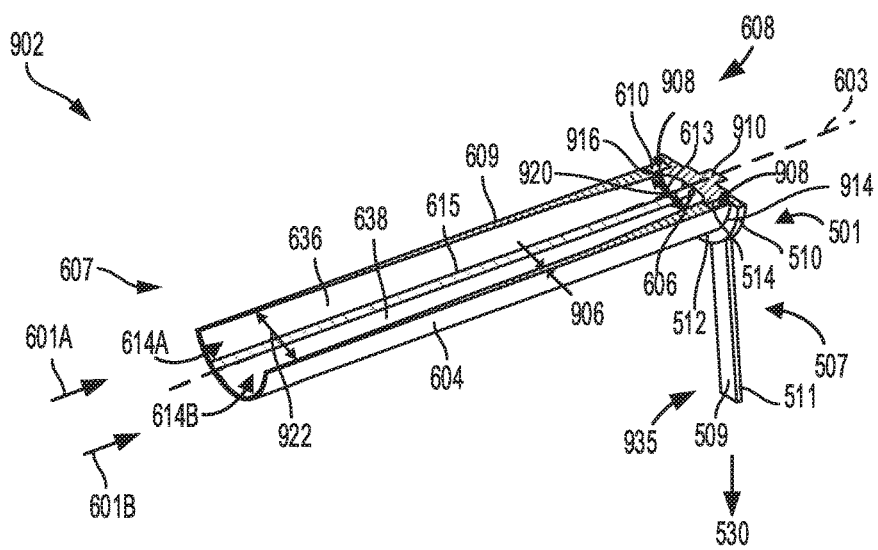
FIG. 9B shows a second cross sectional view of the fourth embodiment of the wastegate valve in the closed position.

FIGS. 7A-7B show schematic views of the fourth embodiment of the wastegate valve in a partially open position. FIG. 7A shows a first view of the wastegate valve in the partially open position. FIG. 7B shows a second view of the wastegate valve in the partially open position. In each of the first and second view of FIGS. 7A-7B, the wastegate valve is partially open to allow exhaust flow in a flow direction toward an exhaust catalyst placed downstream of the wastegate. FIGS. 8A-8B show a first and second view of the wastegate valve in a fully open position. When fully open, exhaust flow through the wastegate outlet may increase and thus reduce a catalyst warm up duration. FIGS. 9A-9B show a first and second cross sectional views of the fourth embodiment of the wastegate valve in a closed position. A raised edge formed on an internal surface of the wastegate valve may act in conjunction with a constricted section formed on an internal wall of a passage of the wastegate, to guide exhaust flow to the exhaust catalyst via the valve outlet. In this way, the wastegate valve and passage may act to expedite catalyst lightoff while minimizing fuel emissions.

FIGS. 10A and 10E show a fifth embodiment of a wastegate valve that includes a recessed slot formed on an inner portion of a valve plate. The recessed slot may be sized to receive a central wall that divides the passage into a first and a second side. The fifth embodiment of a valve plate coupled to one end of a wastegate passage is shown in FIG. 10C. The valve plate includes a recessed slot that is configured to mate with a mating portion of a central wall that divides the wastegate passage into a first and second side. Each side of the passage may be configured to convey exhaust flow towards the valve plate with no or minimal exhaust flow mixing. The recessed slot may be formed between a first and a second portion of a raised edge of the valve plate, as shown in FIG. 10D. A cross sectional view of the wastegate passage is depicted in FIG. 10E. In this view, the central wall bifurcates the passage into the first and second side, the first side formed at an opposite side of the central wall compared to the second side. In this way, each first and second side of the passage may convey exhaust gas towards a passage outlet at the valve plate location with no or minimal mixing of exhaust flow between the two sides of the passage.

FIGS. 2A-10E show example configurations with relative positioning of the various components of the wastegate valve and exhaust passage. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, a schematic diagram of a naturally aspirated multi-cylinder internal combustion engine 10, which may be included in a propulsion system of an automobile is disclosed. Engine 10 may include a plurality of cylinders 20, 21, 22, and 23 (e.g., combustion chambers). In the depicted example, engine 10 includes four cylinders, cylinders 1 through cylinder 4, arranged in an in-line configuration. However, in alternate examples, engine 10 can include one or more cylinders such as 2, 3, 4, 5, 6, 8, 10 or more cylinders, arranged in alternate configurations, such as V-6, I-6, V-12, opposed 4, boxer, etc.

Each cylinder 20-23 of engine 10 may be configured to receive intake air from an intake manifold 27 via an air intake passage 28. Intake passage 28 may include an air intake throttle 62 downstream of a compressor 90 of turbocharger. The intake passage 28 receives intake air via an upstream intake passage 29 which includes an air filter 30. The position of throttle 62 can be adjusted by control system 15 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure via intake passage 28. Intake manifold 27 may be coupled to the combustion chambers via intake ports (not shown). Each intake port may supply air and/or fuel to the cylinder it is coupled to for combustion. Each cylinder intake port can selectively communicate with the cylinder via one or more intake valves. In the depicted example, each cylinder 20-23 is shown with two intake valves I1 and I2. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via two exhaust ports coupled thereto. In the depicted example, each cylinder 20-23 is coupled to a first exhaust port 31 via a first exhaust valve E1, and to a second exhaust port 33 via a second exhaust valve E2. Each exhaust port of each cylinder of a first and second cylinder group may lead to different exhaust manifolds for channeling a first initial portion of exhaust gas (also herein referred to as blowdown portion) and a second latter portion of exhaust gases (also herein referred to as scavenging portion) separately. For example, each of the first exhaust ports 31 and second exhaust ports 33 of the outer cylinders 20 and 23 from a first cylinder group combine into a first exhaust manifold 54A, and each of the first exhaust ports 31 and second exhaust ports 33 of the inner cylinders 21 and 22 from a second cylinder group combine into a second exhaust manifold 54B. Such an exhaust system including two exhaust manifolds will be referred to herein as the "split exhaust system". While the split exhaust system shown in FIG. 1 has a specific configuration of the exhaust passages and exhaust manifolds, in alternate embodiments, a different arrangement of the exhaust passages and manifolds is possible while still have a first subset of cylinders direct exhaust to a first scroll of the turbocharger turbine and a second subset of cylinders direct exhaust to a second scroll of the turbocharger turbine.

Engine 10 may include a turbocharger 190 including a turbine 92 and the compressor 90 that are rotationally coupled via a shaft. In the compressor 90 is positioned within an intake passage and receives intake air from intake passage 29. A compressor bypass valve 126 is arranged in a bypass passage 164 around the compressor 90. The turbine 92 may be a twin (e.g., dual) scroll turbine that includes and receives exhaust gas from a first scroll 59A (coupled to the first exhaust manifold 54A) and second scroll 59B (coupled to the second exhaust manifold 54B). Further, a wastegate 127A may be included in a bypass 166 coupled between an inlet and outlet of the exhaust twin scroll turbine 92 to control an amount of exhaust gas delivered to the twin scroll turbine 92. A portion of the bypass 166 located upstream of the wastegate valve 127A may be a bifurcated passage having a first passage 170 and a second passage 172. The first passage 170 may fluidly couple to the second scroll 59B and the second passage 172 may couple to the first scroll 59A. A first exhaust portion from the first scroll 59A may be diverted to the bypass 166 via the second passage 172, and a second exhaust portion from the second scroll 59B may be diverted to the bypass 166 via the first passage 170. When the wastegate valve is adjusted to an open position, the first and second exhaust portions may be directed to catalyst 72 placed downstream of the wastegate 127A without impinging on side walls of the bypass. By directing the exhaust flow to the catalyst without the exhaust gas fanning out to the side walls of the bypass, exhaust energy losses may be reduced or minimized while expediting catalyst light off during engine operation.

As discussed above, the exhaust manifolds may be designed to separately channel exhaust to the different scrolls of the turbine 92. For example, exhaust gases from a first set of cylinders may be directed to the first scroll 59A (or first exhaust passage directly coupled to the first scroll of the turbine) via first exhaust manifold 54A. Exhaust gases from a second set of cylinders may be directed to the second scroll 59B (or second exhaust passage directly coupled to the second scroll) via second exhaust manifold 54B.

Exhaust gases exiting turbine 92 may pass through catalyst 72 as well. The catalyst 72 may include a plurality of catalyst bricks, in one example. In another example, multiple catalysts, each with a plurality of catalyst bricks, may be used. In some examples, catalyst 72 may be a three-way type catalyst. In other examples, catalyst 72 may include one or a plurality of a diesel oxidation catalyst (DOC), and a selective catalytic reduction catalyst (SCR). After passing through catalyst 72, exhaust gas may be directed out to a tailpipe 58.

In this way, the twin scroll turbine 92 may receive exhaust gases from a first subset of cylinders via a first scroll and exhaust gases from a second subset of cylinders via a second scroll. The wastegate valve 127A may be fluidly coupled to each of the two scrolls and may be adapted to maintain the exhaust flow in the two scrolls separated when the wastegate valve is in a closed position, as explained further below with reference to FIGS. 4A-4E and FIGS. 10A-10E.

In FIG. 1, fuel injectors are shown coupled directly to the combustion chambers for injecting fuel directly therein in proportion to a pulse width of a signal FPW received from controller 12 via an electronic driver, for example. Each cylinder 20-23 is shown coupled with two injectors 74 and 76 per cylinder at each intake valve. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail. In some examples, a distributorless ignition system (not shown) may provide an ignition spark to spark plugs (not shown) coupled to cylinders 20 in response to controller 12.

Engine 10 may be controlled at least partially by a control system 15 including controller 12 and by input from a vehicle operator via an input device, an accelerator pedal input for example. Control system 15 is shown receiving information from a plurality of sensors 16 (various examples of which are described herein) and sending control signals to a plurality of actuators 81. As one example, sensors 16 may include an actuator coupled to wastegate 127A, turbocompressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIGS. 2A-2B. As another example, actuators 81 may include fuel injectors, and throttle 62. Controller 12 may receive input data from the various sensors, process the input data, and trigger the actuators in response to the processed input data based on instruction or code programmed therein corresponding to one or more routines.

In this way, the system of FIG. 1 may comprise: a turbocharger including a bypass passage arranged around the turbine of the turbocharger; a catalyst positioned downstream of the turbine and the bypass passage; a wastegate positioned within the bypass passage, the wastegate comprising: a wastegate passage coupled within the bypass passage, the wastegate passage including a constricted section and a lip formed downstream of the constricted section, at an end of the wastegate passage; a valve plate positioned at the end of the wastegate passage, downstream of the lip, the valve plate including a multiplane curved surface on an interior of the valve plate, the curved surface forming a raised edge on a first side of the valve plate and a side opening on a second side of the valve plate, where the constricted section is aligned on a same side of the wastegate passage as the first side of the valve plate. By providing the multiplane curved surface in the wastegate valve plate and constricted section in the wastegate passage, exhaust flow may be directed downstream in the bypass passage to the exhaust catalyst, without impinging on sidewalls of the bypass passage to minimize exhaust energy losses while expediting catalyst lightoff.

Referring to FIG. 2A, a three dimensional view of an example turbocharger 200 of an internal combustion engine (such as engine 10 shown in FIG. 1), which may be included in a propulsion system of an automobile is disclosed. The turbocharger 200 includes a compressor housing 202, a center housing 208 coupled to the compressor housing, and a turbine housing 216 having a main opening 240. The compressor housing 202 may contain a compressor that compresses and delivers air to the engine via an airflow duct 204, as shown by arrow 206. A bypass passage (not shown) configured with a wastegate valve 220, may be fluidly coupled to the main opening 240 when the wastegate valve 220 is adjusted to an open position.

As shown in FIG. 2A, exhaust flow from the engine may enter the turbine housing 216 via a passage 205, as shown by arrow 244. The passage 205 may be coupled to an exhaust manifold (such as exhaust passage 59 of FIG. 1) connected to a plurality of engine cylinders (such as cylinders 20 of FIG. 1), to allow exhaust gas from the engine to enter the turbine. A plurality of slots 219 formed on an inlet flange 218 attached to a base region of the turbine housing 216, may receive bolts or suitable fasteners to securely attach the turbine housing 216 to the exhaust manifold connected to the engine. At its upstream end, the turbine housing 216 may be connected to the compressor housing 202 via the center housing 208. In this example, the turbine housing 216 is mounted to the center housing 208 by a V-band clamp assemble 212. The outlet 203 in the center housing 208 leads into the main opening 240 having interior walls 213 of the turbine housing 216. A flange 214 formed on an outlet end 242 of the turbine housing 216, may be coupled to an exhaust duct to convey the exhaust gas from the main opening 240 to an exhaust catalyst (e.g., catalyst 72 of FIG. 1) placed downstream of the duct. The flange 214 may be securely fastened to the exhaust duct using bolts or suitable fasteners inserted into slots 215 formed on the flange, such that the main opening 240 is fluidly coupled to the exhaust duct. In this case, exhaust flow from the turbine housing 216 may be conveyed through the main opening 240, where the exhaust gas is further flowed downstream to the exhaust catalyst, for example.

Exhaust flow delivered from the engine to the turbine housing 216 enters the turbine through the passage 205 on the inlet flange 218 and the bypass passage (not shown) as shown by the arrow 244. The wastegate 220 mounted to the bypass passage (not shown), may be provided to control exhaust flow from the bypass passage into the main opening 240, where the exhaust gas is further conveyed to the exhaust catalyst in flow direction 246. The wastegate 220 may include an extendable arm 222, secured on one end to a valve plate 223 of the wastegate 220, and coupled on another end to a first arm 224 of a valve actuation mechanism 225 at a joint location 227. As an example, the extendable arm 222 may be an L shaped arm extended to connect with the first arm 224 which is coupled to a second arm 226 at an extensible joint 233.

The valve actuation mechanism 225 may be coupled to a plunger mechanism 228 by securely fastening a distal end of the second arm 226 to an annular tube 230 of the plunger. As shown, the plunger mechanism 228 is mounted in an aperture 235 formed by an integral bracket 234 attached to the compressor housing 202, and having a plurality of cylindrical elements 236 and an annular cylinder 237. As an example, the cylindrical elements 236 and annular cylinder 237 may provide additional structural integrity to the integrated bracket 234. The plunger mechanism 228 is coupled to an electric motor 232 that may provide electrical power to operate the valve actuation mechanism 225. As an example, the valve actuator is controlled to open the wastegate to allow excess air to bypass the turbine to create required power to increase a compressor boost pressure for a given engine operating condition. In other examples, the valve actuation mechanism 225 may be mechanically, hydraulically or electrically controlled to open and close the wastegate valve during engine operation. In further examples, a combination of mechanical, hydraulic and electrical methods may be applied to actuate the wastegate valve during engine operation.

The wastegate valve may be actuated to fully open in the direction 246 of the exhaust flow, allowing exhaust gas from the engine to be delivered into the main opening 240 via turbine passage 205, where the exhaust is further flowed to the exhaust catalyst. The wastegate valve may be configured with flow formations such as a curved internal wall and a side opening in the valve plate 223 that may act in conjunction with a constricted section in the wastegate passage to more directly guide exhaust flow to the exhaust catalyst and not sidewalls of the main opening 240 of the turbine housing 216. In this way, the wastegate valve may reduce exhaust energy losses due to exhaust gas impinging on walls of the main opening 240 of the turbine housing 216. As a result, catalyst lightoff may be expedited during engine operation while minimizing fuel emissions. Details of the curved internal wall on the wastegate valve and constricted section in the wastegate passage are further disclosed below with reference to FIGS. 2B-4B.

Turning to FIG. 2B, a schematic view 250 of a first embodiment of a wastegate valve 251 and a valve actuation mechanism 252 is shown. The wastegate valve 251 includes a valve plate 270 including a raised edge 276, a first mating feature 278, side openings 259A-259B, and annular portion 268. The valve actuation mechanism 254 includes a shaft portion 253 connected to an arm 255 portion. The first mating feature 278 is depicted as a rib in FIG. 2B (similar to the rib shown in FIGS. 4A-4E, as described further below). However, in alternate embodiments, the first mating feature 278 may instead be a recessed slot (such as the recessed slot shown in FIGS. 10A-10E, as described further below).

As shown, the raised edge 276 on the valve plate 270, may be formed on a top circular surface 271 having a side surface 272 and a downward extending portion 273 connected to the stepped annular cylinders 268. As an example, the raised edge 276 may be formed on the top circular surface 271 and partially surrounding the inner wall 265. The raised edge 276 may be configured with a multiplane curved surface 274 forming a portion of an interior wall 277, and side openings 257A and 257B to direct exhaust flow in a first direction 275, when the wastegate is open, for example. The first mating feature 278 may be centered along the multiplane curved surface 274, thereby dividing an opening on the curved surface into side openings 257A and 257B. The first mating feature 278 may be a rib extending outward from the inner wall 265 and interior wall 277 to separate the raised edge 276 into a first section and a second section, for example. The annular portion 268 is coupled to a side portion (e.g., articulating joint) 266 of the arm 255 portion. The arm portion 255 is coupled to the shaft portion 253 so that it rotates about the axis of the shaft. There may be a joint between arm portion 255 and wastegate valve 251 to allow for some articulation of the valve so that the surface (e.g., seating surface) 271 is able to seal against the mating portion on the turbocharger under all conditions.

The wastegate valve 251 may be mounted to a wastegate passage (not shown) to control exhaust flow from the passage to an exhaust catalyst placed downstream of the wastegate. The wastegate passage may be bifurcated by a central wall that mates with the first mating feature 278 on the curved surface 274 of the valve plate 270. In this case, the central wall in the wastegate passage divides the passage into a first side and a second side, where the first side fluidly couples to the side opening 257A and the second side fluidly couples to the side opening 257B. In this way, a first exhaust portion in the first side of the wastegate passage flows towards the wastegate valve without mixing with a second exhaust portion flowing on the second side of the passage. When in an open wastegate position, exhaust flow through the wastegate passage may be directed out of the passage via the side openings 257A and 257B in direction 275, towards the exhaust catalyst. As an example, the first exhaust portion in the first side of the wastegate passage may flow towards the valve plate and exit via the side opening 257A. The second exhaust portion on the second side of the passage, may flow towards the valve plate and exit via the side opening 257B. The flow formations on the wastegate valve 251 which include the multiplane curved surface 274 and the side openings 257A and 257B may act in conjunction with one another to direct the exhaust flow downstream to the exhaust catalyst, while minimizing exhaust energy losses due to exhaust flow impinging on walls of the wastegate passage. Although not shown, the wastegate passage may also be configured with a constricted section upstream of the wastegate valve, to guide exhaust flow to the exhaust catalyst downstream of the wastegate. Details on flow formations on the wastegate valve 251 and the constricted section in the wastegate passage are disclosed further below with reference to FIGS. 4A-4C. The wastegate valve 251, actuation mechanism 252 and wastegate passage may be comprised of stainless steel or cast iron, for example.

In this way, a multiplane curved surface and side opening may be provided on the wastegate valve to more directly convey the exhaust flow to the exhaust catalyst. As an example, the constricted section in the wastegate passage may act in conjunction with the curved surface on the valve plate to direct the exhaust flow downstream to the exhaust catalyst, thereby allowing expedited catalyst lightoff.

Turning to FIGS. 3A and 3B, cross sectional views of a wastegate 301 including a valve plate 303 and wastegate passage 310 are disclosed. FIG. 3A shows a first view 300 of the wastegate passage 310 with a closed wastegate valve. The wastegate passage 310 includes a constricted section 314 formed on a first internal wall 315 of the passage. In one embodiment, the wastegate passage 310 may be a portion of a bifurcated passage (e.g., passages 170 and 172 shown in FIG. 1) coupled to a first scroll (e.g., first scroll 59A in FIG. 1) and a second scroll (e.g., second scroll 59B in FIG. 1) of a twin scroll turbine, such as turbine 92 shown in FIG. 1. An alternative embodiment 304 of the wastegate passage 310 with no constricted section formed on a first internal wall 315 and second internal wall 317 of the passage, is shown in FIG. 3C. The cross-sectional views shown in FIGS. 3A-3C are rotated such that the mating feature 278 (which is shown as a rib in the example of FIGS. 3A-3C and will be described in further detail below with reference to FIGS. 4A-4E) and dividing wall of the wastegate passage 310 are in a plane of the page. As explained further below with reference to FIG. 4C, the wastegate passage 310 is divided into two passages via the dividing wall and the combination of the dividing wall and mating feature 278 prevent flow communication between the two passages when the valve is closed.

As shown in FIGS. 3A and 3B, the wastegate passage 310 may be configured with a first diameter 326 at the constricted section 314, and a second diameter 328, upstream of the constricted section 314, wherein the first diameter 326 may be smaller than the second diameter 328. Further, a portion of the wastegate passage 310, downstream of the constricted section 314 and upstream of the valve plate 303, may have the second diameter 328. FIG. 3B shows a second view 302 of the wastegate passage 310, with the wastegate valve adjusted to an open position. In each of the first and second views, a second internal wall 317 of each wastegate passage has no constricted section. In this way, the constricted section 314 may only be on a single side of the wastegate passage 310, relative to a central axis 330 of the wastegate passage 310. The valve plate 303 and wastegate passage 310 may be included as a portion of a bypass passage around a turbine (e.g., such as bypass passage 166 disclosed above with reference to FIG. 1).

The valve plate 303 may include an annular portion 313 (which may couple to arm portion 255 shown in FIG. 2B) formed on a top cylindrical portion 307, and a raised edge 306 configured to fit inside an outlet 309 of the wastegate passage. When closed, a base 308 of the raised edge sits adjacent to the constricted section 314 formed on the first internal wall 315 of the wastegate passage 310. The base 308 of the raised edge 306 may sit at a distance 329 from a lip edge 335 of the constriction section 314. The mating feature 278 is shown in the form of a rib and is flush with the base 308. When mounted inside the wastegate passage 310, the raised edge 306 of the valve plate 303 may be adjacent or in face-sharing contact with a lip surface 332 of the passage 310. The constricted section 314 formed in the wastegate passage 310, may be positioned upstream of the raised edge 306, for example. The lip surface 332 of the wastegate passage 310, may be a portion of the passage, positioned downstream of the constricted section 314, that the raised edge 306 of the valve plate 303 sits within, in the closed position. As an example, the lip surface 332 of the wastegate passage 310 may have a length 336. In this case, the lip surface 332 in the wastegate passage 310, may extend from the wastegate outlet 309 to the lip edge 335. In other examples, the lip surface 332 is an internal wall of the wastegate passage 310 forming a lip, and the lip edge 335 is a portion of a wall that forms the constricted section 314.

A curved surface (e.g., multiplane curved surface) 305 on the valve plate 303, may form the raised edge 306 and a side opening 322 to direct exhaust flow in a first direction, as shown by arrow 327. As an example, the curved surface 305 may act in conjunction with the constricted section 314 in the passage 310 to guide exhaust flow directly to an exhaust catalyst downstream of the valve plate 303. The raised edge 306 of the valve plate 303 may have a length 334. In one example, the length 334 of the raised edge 306 may be selected to have a first length, based on position of the constricted section 314 on the first internal wall 315 of the wastegate passage 310. In further examples, the length 334 of the raised edge 306, may be specific to a geometry of the wastegate passage 310, and an amount of flow turning needed to direct the exhaust flow towards a catalyst face.

Furthermore, the top cylindrical portion 307 of the valve plate 303, may have an extended surface 311 forming a lower portion of the top cylindrical portion that may be connected to the raised edge. When closed, extended surface 311 of the valve plate 303 may touch (or be in face-sharing contact with) top surfaces 312 at the outlet of the wastegate passage 310. As shown in FIG. 3B, exhaust gas flow from an engine may be diverted into the wastegate passage 310 as shown by direction 320 at a passage inlet 316. When the valve plate 303 is open, the exhaust gas flows through the wastegate passage 310, and may increase in flow velocity upon approaching the constricted section 314, before exiting the passage from the passage outlet 309, and flowing through the side opening 322 in the valve plate 303. As an example, the constricted section 314 may be only positioned on a first side of the wastegate passage and not on a second side of the passage, wherein the second side of the passage is opposite the first side of the passage relative to the central axis 330 of the passage. FIGS. 3A-3B show an illustrative example of a pivot point 340 about which the wastegate valve pivots (when being moved by the actuator arm, as shown in FIG. 2B). As seen in these figures, the side opening 322 is on an opposite side of the valve from the pivot point 340.

In another example, the constricted section 314, comprising an elevated circumferential surface may be positioned on the first internal wall 315 to constrict flow upstream of the valve plate 303. In one example, the distance 329 may be selected such that the constricted section 314 is positioned at a first distance from the base 308 of raised edge 306 of the valve plate 303. In other examples, the distance 329 may be selected to be a second distance, wherein the second distance is greater than the first distance. In further examples, the constricted section 314 may be selected to have a first diameter that is smaller than a second diameter of the wastegate passage to accelerate the flow in the wastegate passage when the wastegate is open. In one example, the first diameter may be a constricted section diameter, and the second diameter may be a passage diameter. The constricted section diameter may be selected to be less than the passage diameter in order to increase exhaust flow velocities at the passage outlet while minimizing turbulent flow conditions. Further, the constricted section diameter may be selected so that exhaust flow is directed toward a side of the wastegate that includes the curved surface 305 and side opening 322. As shown in FIGS. 3A and 3B, the constricted section 314 may be angled inward towards the central axis 330 and then abruptly diverges back outward towards the first internal wall 315 of the wastegate passage 310. However, in alternate embodiments, the constricted section 314 may be more pronounced or angled gradually both inward and then back outward. As an example, the constricted section 314 may be configured with a circular or an oblong shape having different angles or radii of curvature. As shown, the shape of the constricted section 314 provides a means of guiding exhaust flow towards the passage outlet 309, as shown by arrow 325. Further, the constricted section 314, may act in conjunction with the curved surface 305 on the valve plate to direct exhaust flow through the side opening 322, as shown the arrow 327.

In a case where no constricted section is formed on the first and second internal wall of the wastegate passage, a portion of the exhaust gas may flow downstream while a remaining portion of the exhaust gas may be diverted along direction 324, before being conveyed downstream as shown in FIG. 3C. When diverted along direction 324, the exhaust gas may impinge on passage walls (not shown) downstream of the wastegate, before flowing downstream to the exhaust catalyst. In this case, the exhaust gas may loss a significant quantity of energy (due to energy transferred to the passage walls via conduction) before reaching the exhaust catalyst, leading to delayed catalyst lightoff.

Turning back to FIGS. 3A and 3B, the constricted section 314 is formed on a first side of the wastegate passage 4310 relative to the central axis 330. The raised edge 306 is formed on a first side of the valve plate 303, where the first sides of the valve plate 303 and wastegate passage 310 are aligned with one another. Further, the constricted section 314 curves inward toward the central axis 330 and the curved surface 305 curves inward toward the central axis 330, and a second side of the valve plate 303, in direction of exhaust flow through the wastegate passage 310. In this way, the constricted section 314 formed on the first internal wall 315 of the wastegate passage 310 may act in conjunction with the curved surface 305 on the wastegate valve plate 303 to guide exhaust flow downstream to the exhaust catalyst, thereby allowing expedited catalyst lightoff while reducing fuel emissions.

Figure 4B:
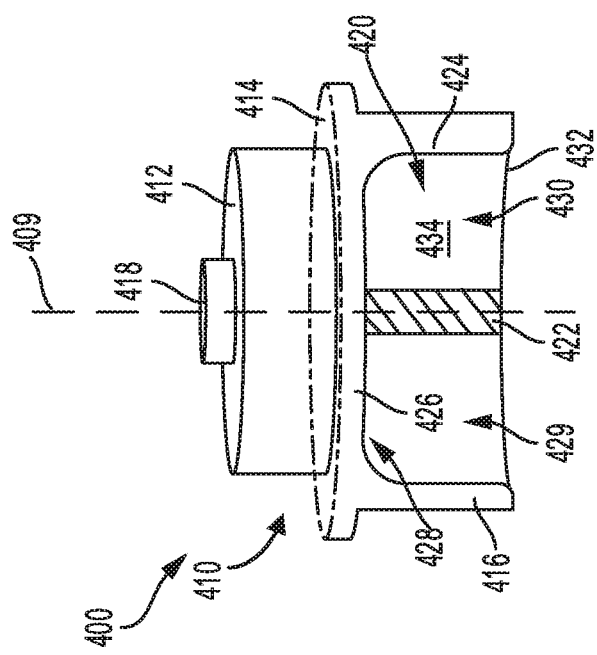
FIG. 4B shows a second three dimensional view of the third embodiment of the wastegate valve.

FIGS. 4A-4E show schematic vies of a third embodiment of a wastegate that may be included in a bypass passage around a twin scroll turbine (such as bypass passage 166 and turbine 92 shown in FIG. 1), where the wastegate includes a valve plate and wastegate passage. In the third embodiment, the wastegate passage may be bifurcated and adapted to mate with a mating feature of the valve plate. Referring first to FIGS. 4A and 4B, schematic views 400 and 402 of the third embodiment of the wastegate valve are disclosed. A valve plate 410 includes an annular portion 412, a base 414, a raised edge 416, a side opening 420 and a rib 422. An annular element 418, formed on an outer surface of the annular portion 412, may provide a means for coupling the valve plate 410 to an actuator (not shown). The annular portion 412 may be connected to the raised edge 416 via the base 414 to form a single integral valve plate. The side opening 420 may be formed on one end of the raised edge 416, between side edges 424 of the raised edge 416 and an outer edge 426 of an inner surface 428 of the valve plate 410. Although not shown, the inner surface 428 may form a curved surface (e.g., multiplane curved surface) on the valve plate 410 that directs exhaust in a particular direction, when the valve plate 410 is adjusted to an open valve position.

The rib 422, formed on a central portion, with respect to a central axis 409 of the valve plate 410, of the raised edge 416 of the valve plate 410, divides the raised edge 416 into a first section 429 and a second section 430, as shown in FIG. 4A. The raised edge 416 may further include a lip edge 432 and an inner wall 434 that extends to the first section 429 and second section 430 of the valve plate 410. The rib 422 may extend outward and away from the inner surface 428 of the valve plate, for example. In another example, the rib 422 may extend toward the lip edge 432 of the raised edge 416. As shown in FIG. 4A, an end of the rib 422 (that is distal from the inner surface 428) is arranged flush with the outer edge of the raised edge 416. The rib 422 of the valve plate 410 may include inner surfaces 436, a mating surface 438 and an outer surface 440, as shown in FIG. 4B.

Referring to FIG. 4C, a cross sectional view 404 of the third embodiment of the wastegate valve is disclosed. The wastegate valve includes the valve plate 410 coupled to a wastegate passage 452. FIG. 4C may show a simplified version of the valve plate 410 which includes the base 414, raised edge 416, side opening 420 and rib 422. As explained above, the rib 422 of the valve plate 410 may divide the raised edge 416 into a first section 429 and a second section 430. In this case, the rib 422 extends from the inner surface 428 to a lip edge 432 of the raised edge 416. The base 414 may connect to the raised edge 416 to form a single integral valve plate. The inner surface 461 on the raised edge 458 may form a curved surface (e.g., multiplane curved surface) on the valve plate 410. The wastegate passage 452 includes a lip surface 472 formed at a junction between a first internal wall 474 and a second internal wall 475 of the wastegate passage 452. A central wall 476 formed in a central portion of the wastegate passage 452 divides the wastegate passage into a first side 478 and a second side 480. Further, a mating portion 479 of the central wall 476 is arranged flush with the lip surface 472.

When the valve plate 410 is adjusted to a closed position, as shown in FIG. 4C, a mating surface 477 of the rib 422 may be in face-sharing contact with a mating portion 479 of the central wall 476 formed in the wastegate passage 452. When in the closed wastegate position, the valve plate 410 is disposed in an opening 468 in the wastegate passage 452. The rib 422 on the valve plate 410 and central wall 476 of the wastegate passage 452 separate the exhaust flow in the first and second sides of the passage. For example, a first exhaust portion on the first side 478 of the passage may flow towards the first section 429 of the valve plate 410 without mixing with a second exhaust portion on the second side 480 of the passage flowing towards the second section 430 of the valve plate 410. In this way, the rib 422 of the valve plate 410 and the central wall 476 of the wastegate passage 452 may stop or minimize flow interaction between the first and second exhaust portions on the first section 478 and second section 480 of the wastegate passage.

When the valve plate 450 is adjusted to an open valve position, the mating surface 477 of the rib 422 may disengage from the mating portion 479 of the central wall 476, thereby allowing the curved surface of the valve plate 410 to direct exhaust flow to an exhaust catalyst downstream of the wastegate. As an example, the first exhaust portion in the first section 429 of the valve plate 410 and the second exhaust portion in the second section 430 of the valve plate 410 may be both directed by the curved surface of the valve plate 410 to the exhaust catalyst, without impinging on side walls of the wastegate passage, thereby minimizing exhaust energy loss and expediting catalyst lightoff. Details of the rib 422 on the valve plate 410 and central wall 476 of the wastegate passage 452 are further disclosed with reference to FIGS. 4D and 4E.

Referring to FIG. 4D, a cross sectional view 406 of the third embodiment of the wastegate valve plate 410 is disclosed. The rib 422 of the valve plate 410 includes a linear portion 482 and a curved portion 484. The linear portion 482 connects to a middle section of the curved portion 484 forming a single continuous component connected to the base 414. As an example, the linear portion 482 of the rib 422 may connect to the curved portion 484 at a junction having a first curved section 488 and a second curved section 490. The curved portion 484 may include terminal ends 486 that partially extend around the inner portion of the base 414. The linear portion 482 of the rib 422 may divide the valve plate 410 into the first section 429 and second section 430, for example. The linear portion 482 of rib 422 may have a height 491 and a width 492. As an example, the height 491 of the linear portion 482 of the rib 422 may range from a minimum bifurcation to full bifurcation of the wastegate port, and the width 492 of the linear portion 482 may range from a minimum thickness to a thickness equal to or less than the central wall 476.

When the valve plate 410 is coupled to the wastegate passage (e.g., passage 452 shown in FIG. 4C), the first section 429 of the valve plate 410 may align with the first side 478 of the wastegate passage 452, and the second section 430 of the valve plate may align with the second side 480 of the wastegate passage 452. In this way, the rib 422 may act in conjunction with the central wall (e.g., central wall 476 shown in FIG. 4C) of the wastegate passage to separate exhaust flow in the first side 478 and second side 480 of the wastegate passage 452.

Referring to FIG. 4E, a cross sectional view 408 of the wastegate passage 452 is disclosed. The central wall 476 of the wastegate passage 452 may connect to a first portion 494 and a second portion 495 of an internal wall of the passage, thereby dividing the passage into the first side 478 and second side 480. The central wall 476 of the wastegate passage 452 may have a height 496 and a width 498. As an example, the height 496 is sized such that an area of first side 478 and second side 480 are sized to enable the maximum wastegate flow through the passage dependent on the engine operation.

Turning to FIGS. 5A-5C, schematic views of a fourth embodiment of a wastegate valve plate 501 are depicted. FIG. 5A shows a first view 500 of wastegate valve plate 501. FIG. 5B shows a second view 502 of the wastegate valve plate 501. The valve plate in the first and second views is shown with a front end 503 and a back end 521 visible. FIG. 5C shows a third view 504 of the wastegate valve plate 501 from a side of the valve plate 501.

As shown in FIGS. 5A-5C, the wastegate valve plate 501 includes an inner circular face 512 and a circular portion 510 formed circumferentially around an outer portion of the valve plate. The valve plate 501 may include a curved surface (e.g., multiplane curved surface) 513 forming a raised edge 505 on a first side 532 of the valve plate 501, and a side opening 506 on a second side 533 of the valve plate 501. When mounted to a wastegate passage (such as wastegate passage 410 shown in FIGS. 3A and 3B) and the wastegate valve is in a closed position, the inner circular surface 512 and curved surface 513 on the valve plate 501 face an interior of the wastegate passage. The raised edge 505 may include a side wall 514 and curved edge 516. The side wall 514 arises (e.g., extends outward) from the inner circular face 512 to an outer edge of the raised edge 505. As an example, the raised edge 505 may have a length 525, similar to length 434 of the raised edge 406 shown in FIG. 3A. The curved surface 513 tapers gradually from the raised edge 505 to a deep portion 520 that forms part of the side opening 506. As an example, the raised edge 505 may be semi-circular in shape, with the side opening 506 formed opposite the raised edge 505 to direct exhaust flow in a first direction, as shown by arrow 515. In another example, the raised edge 505 of the valve plate 501 may be provided in other suitable geometrical configurations. In other examples, the side opening 506 may be formed on the second side 533 of the valve plate opposite the first side 532 of the valve plate 501, which includes a majority of the raised edge 505. As an example, the majority of the raised edge 505 may be located below a first axis 540 of the valve plate, while a second axis 550 divides the valve plate into two symmetrical portions. The side opening 506 on the curved surface 513, may convey exhaust flow to an exhaust catalyst placed downstream of the valve plate 501. As an example, the side opening 506 may be sized to allow adequate exhaust flow through the valve outlet to expedite catalyst lightoff. The curved edge 516 may terminate at opposites ends of the raised edge 505 to form a curved section 523 which gradually tapers off into the side opening 506. The curved surface 513, curves in between the side walls 514 of the raised edge 505 in a plurality of directions, forming a multiplane curved surface that directs exhaust flow in the first direction, as shown by the arrow 515.

A valve arm 507, having a flat surface 509 and side edge 511, may be attached to a cylindrical element 517 formed on a circular element 519, mounted to a back surface 522 of the valve plate. As an example, a proximal portion 526 of the valve arm 507 may be attached to the valve plate 501 while a distal portion 527 of the valve arm 507 may be connected to an actuation mechanism (such as mechanism 225 shown in FIG. 2A) in direction 530, to control opening and closing of the valve plate when mounted to a wastegate passage (such as wastegate passage 410 shown in FIGS. 3A and 3B). In one example, the actuation mechanism controlling the valve plate may be operated using various methods including mechanical, hydraulic or electrical, although other suitable actuation methods may be employed. In this way, the valve plate may be adjusted to open using the actuation mechanism attached to the distal end of the plate, thereby directing exhaust flow from the wastegate passage to the catalyst placed downstream of the valve plate.

Although not shown, the valve plate 501 may further include a first mating feature in the form of a rib or a recessed slot, formed in a central portion of the valve plate. For example, the first mating feature on the valve plate 501 may be a rib (such as rib 422 shown in FIG. 4C) that extends outward and away from a base portion of the valve plate. In this example, the rib may divide an inner portion of the valve plate into a first section (e.g., first section 429 shown in FIG. 4C) and a second section (e.g., second section 430 shown in FIG. 4C) of a wastegate passage (e.g., passage 452 shown in FIG. 4C). When the valve plate 501 is coupled to the wastegate passage, the rib on the valve plate may mate with a central wall in the wastegate passage, thereby dividing the passage into a first flow side (e.g., first side 478 shown in FIG. 4C) and a second flow side (e.g., second side 480 shown in FIG. 4C), respectively of a wastegate passage. In one example, the first and second section of the valve plate 501 may be fluidly coupled to the first and second flow sides, respectively of the wastegate passage.

In another example, the recessed slot on the valve plate 501 may be sized to receive the central wall of a wastegate passage coupled to the valve plate, thereby dividing the wastegate passage into the first and second flow side. The first flow side may be coupled to a first scroll (e.g., scroll 55A in FIG. 1) of a turbine (e.g., turbine 72 shown in FIG. 1), and the second flow side may be coupled to a second scroll (e.g., scroll 55B) of the turbine. In this way, exhaust flow in the first and second scroll may flow (downstream towards the wastegate valve) in separate flow sides of the wastegate passage without mixing. Upon reaching the wastegate valve, exhaust flow may remain separate until the valve plate 501 is adjusted to open position that allows the exhaust in the wastegate passage to flow downstream to a catalyst. The curved surface on the valve plate may guide the exhaust flow directly downstream to the catalyst without impinging on side walls of the passage, thereby minimizing exhaust energy losses while expediting catalyst lightoff.

Turning to FIGS. 6A-6B, schematic views showing a fourth embodiment of a wastegate (e.g., wastegate valve) including the valve plate 501 and valve arm 507 of an actuation mechanism from FIGS. 5A-5C, and a wastegate passage 604 are disclosed. FIG. 6A shows a first view 600 of the fourth embodiment of the wastegate valve in a closed position. FIG. 6B shows a second view 602 of the fourth embodiment of the wastegate valve in the closed position. In each of the first and second views, the valve plate 501 includes a first mating feature 606 in a form of a rib and other similar features as those of the valve plate disclosed above with reference to FIGS. 5A-5C. The exhaust flow from an engine (shown by flow direction 601) enters a main opening 614 formed in an interior region of the wastegate passage 604 at an upstream end 607 of the passage. The exhaust flow from the upstream end 607, may flow through a first opening 614A and a second opening 614B of the wastegate passage 604 to a downstream end 608 of the wastegate. A central wall 615 formed in the wastegate passage 604 divides the passage into a first side 636 and a second side 638.

The valve plate 501 may be mounted at the downstream end 608 of the wastegate passage 604. When the valve plate 501 is closed, an inner circular face 512 of the valve plate abuts against (e.g., is in face sharing contact with) an interior section 620 of the wastegate passage 604, and tightly seals the passage. In the closed wastegate position, raised edge 505 is disposed inside the first opening 614A and second opening 614B at the downstream end 608 of the wastegate, with a side opening 506 formed on an opposite end of the raised edge, closed off by passage walls. The wastegate passage 604 is divided into the first side 636 and second side 638 such that the first side 636 may be connected to a first scroll (e.g., scroll 55A shown in FIG. 1) of a turbine (turbine 72 shown in FIG. 1) and the second side 638 may be connected to a second scroll (e.g., scroll 55B shown in FIG. 1) of the turbine. In this case, a first exhaust portion from the first scroll may flow into the first side 636 of the wastegate passage 604 via the first opening 614A and a second exhaust portion from the second scroll may flow into the second side 638 of the wastegate passage 604 via the second opening 614B of the passage. In this way, the first mating feature (e.g., rib) 606 of the valve plate 501 and the central wall 615 of the wastegate passage 604 may minimizes flow interaction between the first and second exhaust portions on the first side 636 and second side 638 of the wastegate passage.

A curved surface 513 forming the side opening 506, may direct exhaust flow via an outlet of the wastegate passage, when the valve plate 501 is adjusted to an open position, as disclosed further below with reference to FIGS. 7A-7B. In one example, the side opening 506 may have a diameter 650, adequately sized to expedite flow of exhaust through an outlet of the wastegate passage 604, when the valve plate 501 is adjusted to the open position. In other examples, the diameter 650 of the side opening 506 may be equal or larger than a diameter 652 of the wastegate passage 604. In further examples, the valve plate 501 may be adjusted to close, such that a base of the valve plate 501 covers an opening at the end of the passage and an interior side of the base sits against the end of the passage.

Further, the curved surface 513 forming the raised edge 505 and a side opening 506, may be configured with a sloping concave surface (as shown in FIGS. 5A-5C) to direct exhaust flow in a direction toward an exhaust catalyst when the valve plate 501 is adjusted to an open position. The curved surface 513, may be curved in between a side wall 514 in multiple directions, forming a multiplane curved surface that forms the side opening 506 and the raised edge 505. As an example, the curved surface 513, may curve towards the side opening 506, thereby directing exhaust flow towards the exhaust catalyst, as shown further below with reference to FIGS. 7A-7B.

As shown in FIG. 6A, a first clearance 616 and a second clearance 617 may be formed between the side wall 514 of the raised edge 505 and a lip edge 613 on a first internal wall 609 of the wastegate passage 604. Each of the first and second clearances may be sized to allow easy opening and closing of the valve plate 501 without rubbing against the internal walls of the wastegate passage. The raised edge 505 may be sized with a length 622 that minimizes turbulent exhaust flow conditions at the wastegate outlet. As depicted in FIG. 6B, the length 622 of the raised edge 505 may have a first length, based on a position of a constricted section 612, formed between the first internal wall 609 and a lip surface 610 of the wastegate passage and/or based on a desired angle of curvature of the curved surface 513 (e.g., the length 622 may increase to provide a large angle of curvature for the curved surface 513). In other examples, the length 622 of the raised edge 505, may be selected to have a second length, wherein the second length may be greater than the first length. In further examples, the length 622 may be specific to a geometry of the wastegate passage 604 and an amount of flow turning needed to direct the exhaust flow toward an exhaust catalyst.

The raised edge 505 may be positioned at a distance 618 from the constricted section 612, for example. In one example, the distance 618 may be decreased so that the raised edge 505 is in face sharing contact with or adjacent to an edge of the constricted section 612.

As shown in FIGS. 6A-6B, the constricted section 612 formed at the junction between the first internal wall 609 and the lip surface 610 of the wastegate passage. As an example, the constricted section 612 may be formed only on a first side 644 of the wastegate passage, relative to a central axis 603 of the passage, and the first side 644 is a same side as a first side 624 of the valve plate. The constricted section 612 has a height 627 that may be smaller than a threshold height. As an example, the threshold height may be a height of the constricted section that minimizes turbulent flow conditions at the passage outlet. The height 627 of the constricted section 612 and its distance 618 from the valve plate 501 may be selected to produce exhaust flow rates at the passage outlet ranging from a minimum to a maximum required wastegate flow rates. The range of exhaust flow rates at the passage outlet may vary depending on engine type, type of turbocharger, and a number of turbochargers mounted to the engine.

Valve arm 507 mounted on a back surface 522 of the valve plate 501, may be coupled to an actuation mechanism, shown in direction 530. The actuation mechanism may be adjusted to open the valve plate 501, thereby allowing exhaust flow to the exhaust catalyst downstream of the valve plate 501 via the passage outlet. The actuation mechanism may be controlled by various methods including hydraulic, mechanical or electrical, for example. An example showing the valve plate 501 in the open position is disclosed further below with reference to FIGS. 7A-7B.

Turning now to FIG. 6C, a schematic view 605 showing an alternative embodiment of a wastegate (e.g., wastegate valve) including a valve plate 501, valve arm 507 of an actuation mechanism and a wastegate passage 604 is disclosed. The valve plate 501, mounted to a downstream end 608 of the wastegate passage 604, may include a first mating feature 606, a curved surface 513 forming a raised edge 505 and a side opening 506. The first mating feature may be a rib formed on the curved surface 513. The raised edge 505 includes a side wall 514, curved edge 516, and curved section 523 which tapers off into the side opening 506 of the valve plate 501. In this example, a length 622 of the raised edge 505 is shown to be longer compared to the raised edge disclosed in FIGS. 5A-6B. Also, the inner circular surface 512, surrounding the raised edge 505 and the side opening 506, has a smaller surface area compared to the inner circular surface disclosed in FIGS. 5A-6B.

As shown in FIG. 6C, the raised edge 505 is shown as a circular shape but other geometrical shapes may be utilized. Further, the valve plate 501 includes a circular portion 510 that connects the side wall 514 to a circular element 519 formed on a back surface 522 of the valve plate. When the wastegate is closed, the valve plate 501 may be axially mounted to a downstream end 608 of the wastegate passage, along a central port axis 603.

Exhaust flow from an engine enters the wastegate passage 604 via a first opening 614A and a second opening 614B at an upstream end 607 of the passage. A central wall 615 formed in the wastegate passage 604 divides the passage into a first side 636 and a second side 638. When adjusted to a closed wastegate position, the raised edge 505 of the valve plate 501 may be disposed inside the first opening 614A and second opening 614B, at the downstream end 608 of the wastegate passage 604. In this closed wastegate position, the side wall 514 of the raised edge 505 does not touch a first interior wall 630 of the wastegate passage 604, and a side opening 506 formed on an opposite side 626 of the raised edge 505 faces a second internal wall 632 of the passage, for example. In another example, the first mating feature 606 may be disposed inside the passage, such that a mating surface of the first mating feature is in face-sharing contact with one end of the central wall 615.

The first side 636 of the wastegate passage 604 may be connected to a first scroll (e.g., scroll 55A shown in FIG. 1) of a turbine (turbine 72 shown in FIG. 1) and the second side 638 may be connected to a second scroll (e.g., scroll 55B shown in FIG. 1) of the turbine. In this example, a first exhaust portion from the first scroll may flow into the first side 636 of the wastegate passage 604 via the first opening 614A and a second exhaust portion from the second scroll may flow into the second side 638 of the wastegate passage 604 via the second opening 614B of the passage. In this way, the first mating feature 606 of the valve plate 501 and the central wall 615 of the wastegate passage 604 may minimizes flow interaction between the first and second exhaust portions on the first side 636 and second side 638 of the wastegate passage.

The curved surface 513 on the valve plate 501 may guide exhaust flow along a first direction 628A and a second direction 628B, when the wastegate valve is adjusted to an open position. As an example, the first exhaust portion flowing on the first side 636 of the wastegate passage 604 may exit the passage via the first direction 628A and the second exhaust portion flowing on the second side 638 of the wastegate passage 604 may exit the passage via the second direction 628B. In one example, the curved surface 513, may be curved between the side wall 514 in multiple directions, forming a multiplane curved surface that forms the side opening 506 and the raised edge 505. In one example, the curved surface 513, may curve towards the side opening 506, thereby directing exhaust flow along the direction 628.

A valve arm 507 having a flat surface 509 and a planar edge 511, may be coupled at first end 634 to the back surface 522 of the valve plate 501 while a second end 635 of the valve arm 507 may be connected to an actuation mechanism in direction 530. As an example, the actuation mechanism may be a mechanical, hydraulic or electrical actuator, which may be adjusted to open and close the valve plate during engine operation. During engine operation, the actuation mechanism may be adjusted to move the valve arm 507 to pivotably open the valve plate 501, and keep the valve plate open, thereby allowing exhaust flow to an exhaust catalyst placed downstream of the wastegate. When the wastegate is open, the side wall 514 and curved surface 513, which may be partially disposed inside the main opening, may guide exhaust flow via the side opening 506 to the exhaust catalyst.

In this way, the wastegate may direct exhaust flow directly through the wastegate passage to the exhaust catalyst, while minimizing exhaust energy losses due to exhaust flow impinging on passage walls. By more directly flowing the exhaust gas to the exhaust catalyst, exhaust energy may be efficiently used to warm up the catalyst, thereby expediting catalyst lightoff while reducing fuel emissions.

Turning to FIGS. 7A-7B, schematic views showing the fourth embodiment of the wastegate (e.g., wastegate valve) including a valve plate 501 in a partially open position, valve arm 507 of an actuation mechanism, and a wastegate passage 604 are depicted. FIG. 7A shows a first view 700 of the fourth embodiment of the wastegate valve in the partially open position. FIG. 7B shows a second view 702 of the fourth embodiment of the wastegate valve in the partially open position. The partially open position of the wastegate valve may be a position between a fully closed position and a fully open position. When in the fully closed position, there is no exhaust flow through a passage outlet 720, while the fully open position involves a maximal amount of opening, where a maximum amount of exhaust flow passes through the passage outlet 720 and downstream in a bypass passage. In each of the first and second views, the valve plate 501 is partially open to allow exhaust flow in a first direction, as shown by arrow 709. The wastegate passage 604 includes a circular inner edge 705, circular outer edge 706 and main opening 614.

When adjusted to partially open by the actuation mechanism placed at a direction 530, valve arm 507 may tilt the valve plate 501 to open outward in direction 716, such that an inner face 715 of the valve plate 501 may align along axis 712 to form a first tilt angle 710 between axis 712 and axis 714. When the wastegate moves from the closed to the partially open position (or towards the fully open position), the raised edge 505 on the valve plate 501 pivots within a lip surface 610 and the side opening 506 moves outward and away from the passage 604, for example. In another example, the valve plate 501 may be adjusted to open such that a first side 624 of the valve plate 501 hinges within the passage 604 at a first side 644 of the passage 604 that includes the constricted section 612 and a second side 625 of the valve plate 501 is spaced away from the passage at a second side 645 of the passage that does not include the constricted section. As an example, the first side 624 of the valve plate 501, may include the raised edge 505 while the second side 625 includes the side opening 506. In another example, a first internal wall 609 and the lip surface 610 of the wastegate passage 604 may form the first side 644 of the passage, while a second internal wall 611, may form the second side 645 of the passage. Further, the first side 624 of the valve plate 501 and the first side 644 of the wastegate passage may be aligned with one another (e.g., on a same side of the wastegate relative to central axis 603). Similarly, the second side 625 of the valve plate 501 and the second side 645 of the wastegate passage 604 may be aligned with one another (e.g., on a same side of the wastegate relative to the central axis 603).

The wastegate valve may be adjusted into the partially open position with the tilt angle 710 ranging from 5-12 degrees, for example. When the wastegate is adjusted to the partially open position, side wall 514 of the raised edge 505, may remain partially disposed inside a downstream end 608 of the first opening 614A and second opening 614B to guide exhaust flow through the wastegate outlet 720. In the partially open wastegate position, the first mating feature 606 on the valve plate 501 may remain disposed in the wastegate passage at a position adjacent to the central wall 615 that divides the passage into the first side 636 and second side 638.

The exhaust flow from the engine (shown by flow arrows 601A and 601B) may continue to enter the first opening 614A and second opening 614B via an upstream end 607 of the wastegate passage 604. In this case, a first exhaust portion may enter the first side 636, as shown by flow arrow 601A, and a second exhaust portion may enter the second side 638, as shown by flow arrow 601B. The first exhaust portion on the first side 636 of the passage may flow towards the valve plate 501 and exit along a flow direction 709A, and the second exhaust portion on the second side 638 of the passage may flow towards the valve plate 501 and exit along a flow direction 709B. In this way, the first mating feature 606 of the valve plate 501 and the central wall 615 of the wastegate passage 604 may minimizes flow interaction between exhaust portions on the first side 636 and second side 638 of the wastegate passage during engine operation.

The constricted section 612 formed at a junction between the first internal wall 609 and the lip surface 610 of the wastegate passage 604, may cause exhaust flow velocity to increase upstream of the valve plate 501 before the flow exists the side opening 506 along the first direction, as shown by arrow 709. An exhaust flow volume (e.g., amount of exhaust gases) exiting the wastegate outlet 720 may depend on a size of the tilt angle 710 of the wastegate valve. As the tilt angle 710 is increased, the volume of the exhaust gas exiting the wastegate outlet 720, and reaching the exhaust catalyst placed downstream of the wastegate valve may increase. In this way, the tilt angle 710 of the valve plate 501 may be selectively adjusted to vary the amount of the exhaust gas delivered downstream of the wastegate to the exhaust catalyst.

Turning to FIGS. 8A-8B, schematic views showing the fourth embodiment of the wastegate (e.g., wastegate valve) including valve plate 501 in a fully open position, a valve arm 507 of an actuation mechanism, and a wastegate passage 604 are depicted. FIG. 8A shows a cross sectional view 800 of a portion of the wastegate valve in the fully open position. FIG. 8B shows a three dimensional view 802 of the wastegate valve in the fully open position. In the cross sectional view 800, the valve plate 501 is fully open to allow exhaust flow in the second side of the passage to exit in direction 709B. The three dimensional view 802 shows exhaust flow in the first and second sides of the passage exiting along flow directions 70A and 70B.

The wastegate passage 604 includes a first internal wall 609 formed upstream of a lip surface 610. In one example, the first internal wall 609 has a lip edge 613 formed at a constricted section 612 which tapers off to the lip surface 610 of the wastegate passage 604. As an example, the lip surface 610 may be formed downstream of the constricted section 612, the lip surface 610 having a first diameter 722 larger than a second diameter 724 of the constricted section 612. In another example, the first diameter 722 of the lip surface 610 may be the same as a third diameter 725 of the passage 604 upstream of the constricted section 612. In other examples, the constricted section 612 may extend around only a portion of the circumference of the passage 604, wherein the portion is aligned with a first side 624 of the valve plate 501. The first internal wall 609 and the lip surface 610 may define a first side 644 of the wastegate passage while a second internal wall 611 defines a second side 645 of the passage.

As shown in FIGS. 8A-8B, the valve arm 507 attached to a back surface 522 of the valve plate 501, may be adjusted by an actuator positioned in direction 530, to fully open the wastegate valve. For example, when the wastegate moves from the partially open position to the fully open position, the raised edge 505 on the valve plate 501 pivots within a lip surface 610 and a side opening 506 moves outward and away from the passage 604. In another example, the wastegate valve may be pivotably opened by tilting the valve plate 501 at a second tilt angle 806 formed between axes 712 and 714, as shown in FIG. 8A. In one example, the wastegate valve may remain pivotably open with the tilt angle 806 ranging from 12 to 25 degrees, allowing a large volume of exhaust flow through the wastegate outlet 720, as shown by flow direction 709B in FIG. 8A. A first exhaust portion on the first side 636 of the wastegate passage 604 may exit the outlet 720 via flow direction 709A and while a second exhaust portion on the second side 638 of the passage may exit the outlet via flow direction 709B, as shown in FIG. 8B. In this case, the first mating feature 606 and the central wall 615 may create a separating barrier in the wastegate passage 604 that reduces or minimizes mixing of the exhaust flow in the first side 636 and second side 638 of the passage when the valve plate 501 is adjusted to the open position. In other examples, the valve plate 501 may include a curved surface (such as curved surface 513 in FIG. 7A) that forms the side opening 506, and may act in conjunction with the constricted section 612 on the passage 604 to guide exhaust flow via the wastegate outlet 720 to an exhaust catalyst placed downstream of the wastegate valve.

In this way, the curved surface forming the side opening 506 on the valve plate 501, may act in conjunction with the constricted section 612 on the wastegate passage 604, to guide the exhaust flow directly to the exhaust catalyst while reducing exhaust energy losses due to exhaust flow impinging on side walls of the passage. By guiding exhaust flow directly downstream to the exhaust catalyst, warmup duration of the catalyst may be reduced to expedite catalyst lightoff while minimizing fuel emissions.

Turning to FIGS. 9A-9B, schematic views showing the fourth embodiment of the wastegate (e.g., wastegate valve) including a valve plate 501 in a closed position, valve arm 507 attached to an actuation mechanism, and a wastegate passage 604 are depicted. FIG. 9A shows a first cross sectional view 900 of a portion of the first side of the wastegate passage, with the wastegate valve in the closed position. FIG. 9B shows a second cross sectional view 902 of the fifth embodiment of the wastegate valve in the closed position. In each of the first and second cross sectional views, the valve plate 501 is mounted to a downstream end 608 of the wastegate passage 604. The exhaust flow enters the passage via the first opening 614A at an upstream end 607 of the passage, as shown in FIG. 9A. The exhaust flow may enter the passage bifurcated by the central wall 615 via the first opening 614A and second opening 614B at the upstream end 607 of the passage, as shown in FIG. 9B.

The wastegate passage 604 includes a first internal wall 609 and a lip surface 610 forming a first side 644 of the passage. The wastegate passage 604 also includes a second internal wall 611 that forms a second side 645 of the passage. The second internal wall 611 includes a front end 912 that may be in face sharing contact with an inner circular surface 512 of the valve plate 501. The first internal wall 609 includes a side edge 909 that defines a boundary between the first internal wall 609 and the second internal wall 611. The first internal wall 609 may be formed upstream of the lip surface 610, such that a constricted section 612 formed between the two walls, tapers off to the lip surface 610 along a lip edge 613. In one example, the lip surface 610 may be formed downstream of the constricted section 612, the lip surface 610 having a first diameter (such as diameter 722 shown in FIG. 8A) larger than a second diameter 920 of the constricted section 612. When the wastegate is closed, a raised edge 505 on the valve plate 501 may sit within the lip surface 610, for example. In other examples, the constricted section 612 may curve inward, toward central axis 603 of the passage 604, from a position upstream of the valve plate 501 to a position at the lip surface 610 and proximate to the valve plate 501.

The first internal wall 609 has a wall thickness 906 which may gradually increase in size, in a direction 601 of the exhaust flow inside the wastegate passage 604. As an example, the wall thickness 906 of the first internal wall 609 may have a first wall thickness at the upstream end 607, and a second wall thickness at the constricted section 612 of the wastegate passage 604, the second wall thickness larger than the first wall thickness. In one example, the wall thickness 906 of the first internal wall 609 may range from 4 mm-8 mm. In other examples, a sidewall 913 of the wastegate passage 604 may narrow towards the central axis 603 of the passage 604 at the constricted section 612, and the narrowing may increase as the sidewall 913 gets closer to the valve plate. In contrast, the second internal wall 611 may have a uniform wall thickness 907 throughout the length of the wastegate passage 604. As an example, the second internal wall 611 may have a wall thickness in a range of 4 mm-5 mm.

When valve plate 501 is closed, the raised edge 505 may be disposed inside the wastegate passage 604 with a curved edge 516 of the raised edge 505 forming a clearance gap 927 between the curved edge 516 and lip edge 613 upstream of the lip surface 610, as shown in FIG. 9A. As an example, the raised edge 505 may fit within the lip surface 610 when the wastegate is in a closed position. When the wastegate valve is adjusted to an open position, a curved surface 513 that forms the side opening 506, opposite to the raised edge 505, may guide exhaust flow to an exhaust catalyst. For example, the curved surface 513, may be curved between a side wall 514 in multiple directions, forming a multiplane curved surface that forms the side opening 506 and the raised edge 505. In one example, the curved surface 513, may act in conjunction with the constricted section 612 in the passage 604, to guide exhaust flow to the exhaust catalyst.

A front portion of the lip surface 610 may be in face sharing contact with an inner circular surface 512 of the wastegate valve, with the raised edge 505 forming an annular enclosure 917 between the lip edge 613, inner circular surface 512 and lip surface 610. The inner circular surface 512 of the valve plate 501, may abut against the front portion 912 of the wastegate passage 604 along contact interface 914. Similarly, an annular opening 908 may be formed between surfaces of the lip surface 610, inner circular surface 512 and side wall 514 of the raised edge 505, with a side edge 916 forming one of the enclosing walls.

The valve arm 507 may be attached to a central section 910 of the valve plate 501, while a downstream end 935 of the valve arm 507 may be coupled to an actuation mechanism in a direction 530. As example, the valve arm 507 may be adjusted using different types of actuators including mechanical, hydraulic and electrical actuators, to open and close the wastegate valve during engine operation. When adjusted to an open wastegate position, the raised edge 505 of the valve plate 501 may act in conjunction with the constricted section 612 on the wastegate passage 604, to guide exhaust flow to an exhaust catalyst downstream from the wastegate valve. The first mating feature 606 on the valve plate 501 may disengage from one end of the central wall 615, when the valve plate is adjusted to the open position. When the wastegate valve is adjusted to the open position, a first exhaust portion on the first side 636 of the wastegate passage 604 may flow towards the valve plate 501 and exit the passage outlet via a first direction, and a second exhaust portion on the second side 638 of the passage may flow towards the valve plate and exit the passage outlet via a second direction, both exhaust portions being directed to a catalyst placed downstream of the wastegate without impinging on side walls of the passage. In this way, the wastegate may improve exhaust flow efficiency by minimizing exhaust energy losses due to exhaust flow impinging on side walls of the wastegate passage, thereby reducing catalyst warmup duration while minimizing fuel emissions.

Although FIGS. 6A-9B show the rib as the first mating feature of the valve plate that mates with a central wall of the wastegate passage, in alternate embodiments, the wastegate valves shown in FIGS. 6A-9B may instead include the recessed slot as the first mating feature of the valve plate that mates with an extended central wall of the wastegate passage, as shown in FIGS. 10A-10E, as described further below.

FIGS. 10A-10E show schematic vies of a fifth embodiment of a wastegate that may be included in a bypass passage around a twin scroll turbine (such as bypass passage 166 and turbine 92 shown in FIG. 1), where the wastegate includes a valve plate and wastegate passage. In the fifth embodiment, the wastegate passage may be bifurcated and adapted to mate with a mating feature of the valve plate. Referring to FIGS. 10A and 10B, schematic views 1000 and 1002 of the fifth embodiment of the wastegate valve are disclosed. A valve plate 1010 includes an annular portion 1012, a base 1014, a raised edge 1016, a side opening 1020 and a recessed slot 1022. An annular element 1018, formed on an outer surface of the annular portion 1012, may provide a means of coupling the valve plate 1010 to an actuator (not shown). The annular portion 1012 is connected to the raised edge 1016 via the base 1014, forming a single integral valve plate. The side opening 1020 may be formed on one end of the raised edge 1016, between side edges 1024 of the raised edge 1016 and an outer edge 1026 of an inner surface 1028. Although not shown, the inner surface 1028 may form a curved surface (e.g., multiplane curved surface) of the valve plate 1010.

As shown in FIG. 10A, the recessed slot 1022 formed in a central portion, relative to central axis 1009 of the valve plate 1010, of the raised edge 1016 of the valve plate 1010, may divide the raised edge 1016 into a first section 1029 and a second section 1030. The raised edge 1016 may further include a lip edge 1032 and an inner wall 1034 that extends to the first section 1029 and second section 1030. The recessed slot 1022 may extend from the inner surface 1028 of the valve plate 1020 to the lip edge 1032 of the raised edge 1016. The recessed slot 1022 may be recessed into the inner wall 1034 and/or the inner surface 1028 of the valve plate 1020. As an example, the recessed slot 1022 may be sized to receive a mating surface of a central wall, as disclosed further with reference to FIG. 10C.

When the valve plate 1010 is coupled to a wastegate passage (e.g., passage 310 in FIGS. 3A and 3B) in a closed position, the central wall of the wastegate passage may be positioned against and disposed in the recessed slot 1022, with a mating surface of the central wall making face contact with inner surfaces of the recessed slot 1022. In this case, the central wall may divide the wastegate passage into a first side and a second side, where a first exhaust portion on the first side of the passage flows towards the first section 1029 of the valve plate 1010, and a second exhaust portion in the second side of the passage flows into the second section 1030 of the valve plate 1010. The central wall in the wastegate passage may extend into the recessed slot 1022, to separate the first exhaust portion on the first side of the passage from the second exhaust flow portion on the second side of the passage, thereby minimizing flow interaction between the first and second exhaust portions in the passage.

When the valve plate 1010 is adjusted to an open valve position, the mating surface of the central wall in the wastegate passage may disengage from the recessed slot 1022, and the curved surface of the valve plate 1010 may direct exhaust flow to an exhaust catalyst downstream of the wastegate. As an example, the first exhaust portion on the first side of the wastegate passage and second exhaust portion on the second passage may be directed by the curved surface of the valve plate 1010 to the exhaust catalyst, without impinging on side walls of the wastegate passage, thereby minimizing exhaust energy loss and expediting catalyst lightoff. Details of the recessed slot 1022 on the valve plate 1010 and the central wall in the wastegate passage are disclosed further with reference to FIG. 10C.

Referring to FIG. 10C, a cross sectional view 1004 of the fifth embodiment of the wastegate valve is disclosed. The embodiment shown in FIGS. 10C-10E may be simplified relative to the embodiment shown in FIGS. 10A-10B; however, features of the embodiments shown in FIGS. 10C-10E may be similar, though different reference numbers may be used between the figures, as explained further below. The wastegate valve includes a valve plate 1050 (similar to valve plate 1010 shown in FIGS. 10A-10C) coupled to a wastegate passage 1052. The valve plate 1050 includes a base 1054, a raised edge 1058, a side opening 1059 and a recessed slot 1060. For example, the recessed slot 1060 of the valve plate 1050 may receive a mating portion 1075 of a central wall 1076 of the wastegate passage 1052 that divides the raised edge 1016 into a first section 1062 and a second section 1064. As an example, the mating portion 1075 of the central wall 1076 may be one end of the central wall. The central wall 1076 may extend from the wastegate passage 1052 into the valve plate 1050, past the lip edge 1070 of the raised edge 1058, and into recessed slot 1060, thereby dividing the valve plate 1050 into the first section 1062 and second section 1064 of the valve plate 1050. In this way, the central wall 1076 extends all the way to an inner surface 1053 of the base 1054. An annular element 1056, formed on an outer surface of the base 1054 of the valve plate 1050, may provide a means for coupling the valve plate 1050 to an actuator (not shown). The base 1054 is connected to the raised edge 1058 to form a single integral valve plate. An inner surface 1061 on the raised edge 1058 may form a curved surface (e.g., multiplane curved surface) on the valve plate 1050. Although not shown, the wastegate passage 1052 may include a lip surface (e.g., lip surface 472 shown in FIG. 4C) formed at a junction between a first and a second internal wall of the wastegate passage. The central wall 1076 formed in a central portion of the wastegate passage 1052 divides the wastegate passage into a first side 1078 and a second side 1080.

When the valve plate 1050 is adjusted to a closed valve position, the mating portion 1075 of the central wall 1076 of the wastegate passage 1052 is disposed in the recessed slot 1022 on the valve plate 1050. In the closed wastegate position, the valve plate 1050 is disposed inside an opening 1068 in the wastegate passage 1052. When the valve plate 1050 is closed, a first exhaust portion on the first side 1078 of the passage may flow towards the first section 1029 of the valve plate 1050, and a second exhaust portion on the second side 1080 of the passage may flow towards the second section 1030 of the valve plate 1050. In this way, the central wall 1076 of the wastegate passage 1052 may provide a barrier that stops the first exhaust portion on the first side 1078 of the passage from mixing with the second exhaust portion on the second side 1080 of the passage. In this way, the central wall 1076 of the wastegate passage 1052 may be positioned in the recessed slot of the valve plate 1050 to stop flow interaction between exhaust portions in the first side 1078 and second side 1080 of the wastegate passage.

When the valve plate 1050 is adjusted to an open position, exhaust flow in the wastegate passage is directed to a catalyst placed downstream of the wastegate. In this case, the first and second exhaust portions on the first side 1078 and second side 1080 of the wastegate passage 1052 may be directed to the catalyst without allowing exhaust flow to impinge on side walls of the wastegate passage 1052. In this way, exhaust energy losses in the wastegate passage are minimized while expediting catalyst lightoff. Details of the recessed slot 1022 on the valve plate 1050 and central wall 1076 of the wastegate passage 1052 are further disclosed with reference to FIGS. 10D and 10E.

Referring to FIG. 10D, a cross sectional view 1006 of the fifth embodiment of the wastegate valve plate 1050 is disclosed. The recessed slot 1022 of the valve plate 1050 may be formed between a first curved portion 1082 of the raised edge 1058 and a second curved portion 1084 of the raised edge 1058. For example, the recessed slot 1022 of the valve plate 1050 may be formed between a first end 1086 of the first curved portion 1082 and a first end 1088 of the second curved portion 1084. Each of the first and second curved portion 1082 and 1084 may include a second end 1090 and 1092 that partially extends around an inner portion 1085 of the base 1054. The recessed slot 1022 may be sized to receive a central wall (e.g., central wall 1076 shown in FIG. 10C) of the wastegate passage that divides the wastegate passage into the first and a second side. The recessed slot 1022 may have a height 1094 and a width 1096 which are sized and shaped to fit over the central wall 1076 when the valve plate 1050 is closed against the wastegate passage.

When the valve plate 1050 is coupled to the wastegate passage (e.g., passage 1052 shown in FIG. 10C), the first section 1062 of the valve plate 1050 may align with the first side 1078 of the wastegate passage 1052, and the second section 1064 of the valve plate may align with the second side 1080 of the wastegate passage 1052. In this way, the central wall (e.g., central wall 1076 shown in FIG. 10C) of the wastegate passage may be positioned in the recessed slot 1022 to separate exhaust flow in the first and second portions of the wastegate passage 1052.

Referring to FIG. 10E, a cross sectional view 1008 of the wastegate passage 1052 is disclosed. The central wall 1076 of the wastegate passage 1052 may connect to a first section 1095 and a second section 1097 of an internal wall of the passage, thereby dividing the passage into the first side 1078 and second side 1080. The central wall 1076 of the wastegate passage 1052 may have a height 1098 and a width 1099 which are sized so that the area of first side 1078 and second side 1080 are sized to enable the maximum wastegate flow through the passage dependent on the engine operation.

In this way, wastegate valve may include a central wall that divides the passage into a first side and a second side, where the first side of the passage receives a first exhaust portion from a first scroll of a turbine, and the second side of the passage receives a second exhaust from a second scroll of a turbine. The central wall is adapted to mate with a mating feature on an interior of the valve plate of the wastegate valve. The mating feature on the valve plate may be a rib (as shown in FIGS. 4A-4E) or a recessed slot (as shown in FIGS. 10A-10E). Either of the rib or the recessed slot embodiments may be combined with any of the other embodiments of the wastegate valve disclosed herein. The central wall either extends to a lip edge of a raised edge of the valve plate (in the rib embodiment) or extends past the lip edge and to an inner wall of a base of the valve plate (in the recessed slot embodiment). In this way, an end of the central wall of the wastegate passage may be adapted to have face-sharing contact with the mating feature of the valve plate when the valve plate is closed against the wastegate passage. In this position, flow between the two scrolls, on either side of the central wall, remain separated. By separating exhaust flow in the wastegate passage, flow interaction between exhaust portions in the first and second sides of the wastegate passage is minimized.

The technical effect of directing exhaust flow to the catalyst downstream of the wastegate without exhaust gas fanning out in multiple directions, allows the wastegate to reduce exhaust energy losses to turbocharger walls. Further, the technical effect of providing the constricted section in the wastegate passage, allows the exhaust flow in the passage to speed up before exiting the wastegate, thereby reducing exhaust energy losses to passage walls while expediting catalyst lightoff. Further yet, the technical effect of providing a mating feature on the valve plate and a central wall in the wastegate passage, allows the passage to be divided into a first and a second side, where exhaust flow in either side of the passage does not mix. The two groups of cylinders may be established such that in the firing order of the engine, the exhaust from subsequent cylinders alternates between the first scroll and the second scroll. Such a configuration can allow a four cylinder engine to use exhaust valve lift durations that exceed 180 degrees without having the high exhaust manifold pressure of one cylinder at the beginning of the exhaust event pushing exhaust gas into the previous cylinder at the end of its exhaust event. Exhaust valve lift durations greater than 180 degrees are desirable to improve pumping efficiency of the engine. Additionally, using a manifold and turbocharger with separated passages allows for smaller volume between the cylinder exhaust valves and the turbine which increases the conversion of blowdown exhaust energy into turbine work. This can improve the fuel economy and transient performance of the vehicle.

In one example, a wastegate, comprises: a valve plate including an interior with a multiplane curved surface and a first mating feature centered along the curved surface, the curved surface forming a raised edge and a side opening on opposite sides of the valve plate; and a passage bifurcated by a central wall, an end of the central wall including a second mating feature adapted to have face-sharing contact with the first mating feature.

In the preceding example, additionally or optionally, the valve plate is positioned at an end of the passage and wherein the passage includes a constricted section positioned upstream of the valve plate and aligned with the raised edge. In any or all of the preceding examples, additionally or optionally, the curved surface forms the raised edge on a first side of the valve plate and the side opening on a second side of the valve plate. In any or all of the preceding examples, additionally or optionally, the first mating feature is a rib extending outward from the curved surface and toward the central wall in the passage. In any or all of the preceding examples, additionally or optionally, the rib includes a linear portion connected to a curved portion, the linear portion extending outward along the raised edge and the curved portion extending circumferentially along a portion of the curved surface.

In any or all of the preceding examples, additionally or optionally, the first mating feature is a recessed slot formed on the curved surface, the recessed slot shaped to receive the second mating feature of the central wall. In any or all of the preceding examples, additionally or optionally, when the valve plate is in a closed position, the first mating feature and the central wall divide the passage into a first side and a second side, where the first side is formed opposite to the second side. In any or all of the preceding examples, additionally or optionally, the passage includes a constricted section that extends around only a portion of a circumference of the passage, wherein the portion is aligned with the first side of the valve plate. In any or all of the preceding examples, additionally or optionally, the passage further includes a lip formed downstream of the constricted section, the lip having a larger diameter than the constricted section.

In another example, a wastegate, comprises: a valve plate including a multiplane curved surface formed on an interior base of the valve plate, the curved surface forming a raised edge on a first side of the valve plate and a side opening on a second side of the valve plate, and a rib centered in the valve plate and extending outward from the curved surface; and a passage bifurcated by a central wall, an end of the central wall adapted to mate with the rib, the valve plate positioned at an end of the passage. In the preceding example, additionally or optionally the passage includes a constricted section positioned upstream of the valve plate, on a first side of the passage, where the first side of the passage is aligned with the second side of the valve plate. In any or all of the preceding examples, additionally or optionally, the passage further includes a lip formed downstream of the constricted section, the lip having a larger diameter than the constricted section. In any or all of the preceding examples, additionally or optionally, the end of the central wall is arranged flush with the lip and wherein an outer end of the rib that is adapted to mate with the end of the central wall is arranged flush with the raised edge. In any or all of the preceding examples, additionally or optionally, when the valve plate is in a closed position, the rib and the central wall divide the passage into a first side and a second side, where the first side is formed opposite to the second side. In any or all of the preceding examples, additionally or optionally, when the valve plate is in the closed position, the rib and the multiplane curved surface of the valve plate face an interior of the passage and the side opening faces an interior sidewall of the passage.

In yet another example, a system, comprises: a twin scroll turbine including a first scroll and a second scroll; a bypass passage coupled at a first end to the first scroll and second scroll and at a second end to a catalyst positioned downstream of the turbine; and a wastegate positioned within the bypass passage, the wastegate comprising: a wastegate passage coupled within the bypass passage, the wastegate passage including a central wall separating the wastegate passage into a first passage in fluid communication with the first scroll and a second passage in fluid communication with the second scroll, where an end of the central wall extends past an end of an outer walla lip of the wastegate passage; and a valve plate positioned at an end of the wastegate passage and including a multiplane curved surface on an interior of the valve plate, the curved surface forming a raised edge on a first side of the valve plate and a side opening on a second side of the valve plate, where a slot is formed in a center of the raised edge and an end of the central wall is adapted to mate with the slot. In the preceding example, additionally or optionally, the wastegate passage includes a constricted section and a lip is formed downstream of the constricted section, at an end of the wastegate passage. In any or all of the preceding examples, additionally or optionally, the valve plate is positioned at the end of the wastegate passage, downstream of the lip and wherein when the valve plate is in a closed position, the raised edge is positioned against the lip. In any or all of the preceding examples, additionally or optionally, the constricted section is aligned on a same side of the wastegate passage as the first side of the valve plate.

Note that the example systems included herein can be used with various wastegate valve system configurations. It will be appreciated that the configurations disclosed herein are exemplary in nature, and that these specific embodiments are not to be considered in a limiting sense, because numerous variations are possible. For example, the above technology can be applied to various wastegate valve systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wastegate, comprising:
a valve plate including an interior with a multiplane curved surface and a first mating feature centered along the curved surface, the curved surface forming a raised edge and a side opening on opposite sides of the valve plate; and
a passage bifurcated by a central wall, an end of the central wall including a second mating feature adapted to have face-sharing contact with the first mating feature;
wherein the passage includes a constricted section positioned upstream of the valve plate, on a first side of the passage, where the first side of the passage is aligned with the second side of the valve plate;
wherein the passage further includes a lip formed downstream of the constricted section, the lip having a larger diameter than the constricted section;
wherein the end of the central wall is arranged flush with the lip and wherein an outer end of the rib that is adapted to mate with the end of the central wall is arranged flush with the raised edge.

2. The wastegate of claim 1, wherein the valve plate is positioned at an end of the passage.

3. The wastegate of claim 1, wherein the curved surface forms the raised edge on a first side of the valve plate and the side opening on a second side of the valve plate.

4. The wastegate of claim 1, wherein the first mating feature is a rib extending outward from the curved surface and toward the central wall in the passage.

5. The wastegate of claim 4, wherein the rib includes a linear portion connected to a curved portion, the linear portion extending outward along the raised edge and the curved portion extending circumferentially along a portion of the curved surface.

6. The wastegate of claim 1, wherein the first mating feature is a recessed slot formed on the curved surface, the recessed slot shaped to receive the second mating feature of the central wall.

7. The wastegate of claim 1, wherein when the valve plate is in a closed position, the first mating feature and the central wall divide the passage into a first side and a second side, where the first side is formed opposite to the second side.

8. The wastegate of claim 1, wherein the constricted section extends around only a portion of a circumference of the passage, wherein the portion is aligned with the first side of the valve plate.

9. A wastegate, comprising:
 a valve plate including a multiplane curved surface formed on an interior base of the valve plate, the curved surface forming a raised edge on a first side of the valve plate and a side opening on a second side of the valve plate, and a rib centered in the valve plate and extending outward from the curved surface; and
 a passage bifurcated by a central wall, an end of the central wall adapted to mate with the rib, the valve plate positioned at an end of the passage;
 wherein the passage includes a constricted section positioned upstream of the valve plate, on a first side of the passage, where the first side of the passage is aligned with the second side of the valve plate;
 wherein the passage further includes a lip formed downstream of the constricted section, the lip having a larger diameter than the constricted section;
 wherein the end of the central wall is arranged flush with the lip and wherein an outer end of the rib that is adapted to mate with the end of the central wall is arranged flush with the raised edge.

10. The wastegate of claim 9, wherein when the valve plate is in a closed position, the rib and the central wall divide the passage into a first side and a second side, where the first side is formed opposite to the second side.

11. The wastegate of claim 9, wherein when the valve plate is in the closed position, the rib and the multiplane curved surface of the valve plate face an interior of the passage and the side opening faces an interior sidewall of the passage.

12. A system, comprising:
 a twin scroll turbine including a first scroll and a second scroll;
 a bypass passage coupled at a first end to the first scroll and second scroll and at a second end to a catalyst positioned downstream of the turbine; and
 a wastegate positioned within the bypass passage, the wastegate comprising:
  a wastegate passage coupled within the bypass passage, the wastegate passage including a central wall separating the wastegate passage into a first passage in fluid communication with the first scroll and a second passage in fluid communication with the second scroll, where an end of the central wall extends past a lip of the wastegate passage; and
  a valve plate positioned at an end of the wastegate passage and including a multiplane curved surface on an interior of the valve plate, the curved surface forming a raised edge on a first side of the valve plate and a side opening on a second side of the valve plate, where a slot is formed in a center of the raised edge and an end of the central wall is adapted to mate with the slot.

13. The wastegate of claim 12, wherein the wastegate passage includes a constricted section and the lip is formed downstream of the constricted section, at an end of the wastegate passage.

14. The wastegate of claim 13, wherein the valve plate is positioned at the end of the wastegate passage, downstream of the lip and wherein when the valve plate is in a closed position, the raised edge is positioned against the lip.

15. The wastegate of claim 13, wherein the constricted section is aligned on a same side of the wastegate passage as the first side of the valve plate.

* * * * *